(12) United States Patent
Simplicio, Jr. et al.

(10) Patent No.: US 11,018,877 B2
(45) Date of Patent: May 25, 2021

(54) CRYPTOGRAPHIC METHODS AND SYSTEMS FOR MANAGING DIGITAL CERTIFICATES

(71) Applicants: LG ELECTRONICS, INC., Seoul (KR); UNIVERSITY OF SÃO PAULO, São Paulo (BR)

(72) Inventors: Marcos A. Simplicio, Jr., São Paulo (BR); Eduardo Lopes Cominetti, São Paulo (BR); Harsh Kupwade Patil, Fremont, CA (US); Jefferson E. Ricardini Fernandez, São Paulo (BR); Marcos Vinicius M. Silva, São Paulo (BR)

(73) Assignees: LG Electronics, Inc., Seoul (KR); University of Sao Paulo, Sao Paulo (BR)

( * ) Notice: Subject to any disclaimer, the term of this patent is extended or adjusted under 35 U.S.C. 154(b) by 0 days.

(21) Appl. No.: 16/702,356

(22) Filed: Dec. 3, 2019

(65) Prior Publication Data

US 2020/0119930 A1     Apr. 16, 2020

Related U.S. Application Data

(63) Continuation of application No. 16/165,871, filed on Oct. 19, 2018, now Pat. No. 10,536,279.

(Continued)

(51) Int. Cl.
*H04L 9/32* (2006.01)
*H04L 9/30* (2006.01)
(Continued)

(52) U.S. Cl.
CPC .............. *H04L 9/3268* (2013.01); *H04L 9/14* (2013.01); *H04L 9/30* (2013.01); *H04L 63/0823* (2013.01);

(Continued)

(58) Field of Classification Search
CPC .......... G06F 16/183; G06F 8/658; G06F 8/65; G06F 21/125; G06F 21/54; G06F 21/56;
(Continued)

(56) References Cited

U.S. PATENT DOCUMENTS

| 5,432,852 A | 7/1995 | Leighton et al. |
| 7,685,425 B1 * | 3/2010 | Wright ................ H04L 63/0442 713/176 |

(Continued)

OTHER PUBLICATIONS

W. Whyte, A. Weimerskirch, V. Kumar, and T. Hehn, "A security credential management system for V2V communications," IEEE Vehicular Networking Conference, 2013, pp. 1-8. 2013.

(Continued)

*Primary Examiner* — Abiy Getachew
(74) *Attorney, Agent, or Firm* — Duane Morris LLP

(57) ABSTRACT

Pseudonym digital certificates (160*p*) are generated for devices (110/150) by a Pseudonym Certificate Authority (PCA), which communicates with devices via another entity—registration authority (RA)—so that the PCA and RA cannot associate certificates with devices. Each certificate is associated with a public signature key, and with a public encryption key used by PCA to encrypt the certificate to hide it from the RA. Both keys are derived by PCA from a single key. For example, the signature key can be derived from the public encryption key rather than generated independently. However, high security is obtained even when the PCA does not sign the encrypted certificate. Reduced bandwidth and computational costs are obtained as a result. Other embodiments are also provided.

24 Claims, 13 Drawing Sheets

Related U.S. Application Data

(60) Provisional application No. 62/575,514, filed on Oct. 22, 2017.

(51) Int. Cl.
*H04L 29/06* (2006.01)
*H04L 9/14* (2006.01)
*H04L 29/08* (2006.01)
*H04W 4/40* (2018.01)
*H04W 12/041* (2021.01)
*H04W 12/069* (2021.01)

(52) U.S. Cl.
CPC .............. *H04L 67/12* (2013.01); *H04W 4/40* (2018.02); *H04W 12/041* (2021.01); *H04W 12/069* (2021.01); *H04L 2209/42* (2013.01)

(58) Field of Classification Search
CPC ... G06F 21/57; G06F 8/60; G06F 8/61; G06F 8/70; G06F 21/10; G06F 21/16; G06F 21/6218; G06F 2221/2143; G06F 3/04817; G06F 21/32; G06F 21/6209; G06F 16/116; G06F 16/1744; G06F 2009/45575; G06F 21/602; G06F 8/433; G06F 8/4441; G06F 9/45558; H04L 67/34; H04L 69/04; H04L 9/00; H04L 29/06; H04L 63/02; H04L 63/0428; H04L 63/0876; H04L 63/10; H04L 63/105; H04L 63/20; H04L 67/02; H04L 67/10; H04L 67/28; H04L 67/2823; H04L 67/2857; H04L 67/42; H04L 63/0435; H04L 63/0861; G06Q 30/02; Y10S 707/99953; Y10S 707/99954
See application file for complete search history.

(56) References Cited

U.S. PATENT DOCUMENTS

| | | | | |
|---|---|---|---|---|
| 8,756,432 | B1* | 6/2014 | Chen ...................... | G06F 21/51 713/188 |
| 9,137,017 | B2* | 9/2015 | Fu ......................... | H04L 9/3263 |
| 2002/0029279 | A1 | 3/2002 | Campbell et al. | |
| 2004/0128395 | A1 | 7/2004 | Miyazaki | |
| 2008/0189774 | A1 | 8/2008 | Ansari et al. | |
| 2009/0298576 | A1* | 12/2009 | Nguyen ................ | G07F 17/323 463/25 |
| 2010/0205457 | A1 | 8/2010 | Jogand-Coulomb et al. | |
| 2012/0102318 | A1 | 4/2012 | Vanstone | |
| 2013/0227297 | A1 | 8/2013 | Gantman et al. | |
| 2014/0059348 | A1 | 2/2014 | Ronda et al. | |
| 2017/0180989 | A1 | 6/2017 | Etzel et al. | |
| 2019/0123915 | A1* | 4/2019 | Simplicio, Jr. ... | H04W 12/0401 |

OTHER PUBLICATIONS

Camp, "Security credential management system proof-of-concept implementation—EE requirements and specifications supporting SCMS software release 1.1," Vehicle Safety Communications Consortium, Tech. Rep., May 2016. [Online]. Available: https://www.its.dot.gov/pilots/pdf/SCMS_POC_EE_Requirements.pdf May 2016.
M. Khodaei and P. Papadimitratos, "The key to intelligent transportation: Identity and credential management in vehicular communication systems," IEEE Vehicular Technology Magazine, vol. 10, No. 4, pp. 63-69, Dec. 2015.
NIST, Federal Information Processing Standard (FIPS 197)—Advanced Encryption Standard (AES), National Institute of Standards and Technology, U.S. Department of Commerce. Gaithersburg, MD, USA, Nov. 2001, available: http://csrc.nist.gov/publications/fips/fips197/fips-197.pdf. Nov. 2001.
NIST, Federal Information Processing Standard (FIPS 180-4)—Secure Hash Standard (SHS), National Institute of Standards and Technology, U.S. Department of Commerce, (NIST). Gaithersburg, MD, USA, Aug. 2015, DOI:10.6028/NIST.FIPS.180-4. Aug. 2015.
NIST, Federal Information Processing Standard (FIPS 202)—SHA-3 Standard: Permutation-Based Hash and Extendable-Output Functions, National Institute of Standards and Technology, U.S. Department of Commerce. Gaithersburg, MD, USA, Aug. 2015, DOI:10.6028/NIST.FIPS.202. Aug. 2015.
J. Douceur, "The Sybil attack," in Proc. of 1st International Workshop on Peer-to-Peer Systems (IPTPS). Springer, Jan. 2002. [Online]. Available: https://www.microsoft.com/en-us/research/publication/the-sybil-attack/ Jan. 2002.
R. Moalla, B. Lonc, H. Labiod, and N. Simoni, "Risk analysis study of ITS communication architecture." in 3rd International Conference on The Network of the Future, 2012, pp. 2036-2040. 2012.
L. Lamport, "Password authentication with insecure communication," Commun. ACM, vol. 24, No. 11, pp. 770-772, 1981.
B. Preneel, Davies-Meyer Hash Function. Boston, MA: Springer US, 2005, pp. 136-136. 2005.
E. Biham, "How to decrypt or even substitute DES-encrypted messages in 228 steps," Inf. Process. Lett., vol. 84, No. 3, pp. 117-124, Nov. 2002. 2002.
N. Mouha and A. Luykx, "Multi-key security: The Even-Mansour construction revisited," in Advances in Cryptology—CRYPTO 2015: 35th Annual Cryptology Conference. Berlin, Heidelberg: Springer Berlin Heidelberg, 2015, pp. 209-223. 2015.
D. Cooper, S. Santesson, S. Farrell, S. Boeyen, R. Housley, and W. Polk, "RFC 5280—Internet X.509 Public Key Infrastructure Certificate and Certificate Revocation List (CRL) profile," RFC 5280—https://tools.ietf.org/html/rfc5280#section-4.2.1.3, May 2008. May 2008.
D. McGrew, M. Curcio, and S. Fluhrer, "Hash-based signatures," Internet Engineering Task Force, Internet-Draft draft-mcgrew-hash-sigs-06, Mar. 2017, work in Progress. [Online]. Available: https://datatracker.ietf.org/doc/html/draft-mcgrew-hash-sigs-06 Mar. 2017.
E. Andrade, M. Simplicio, P. Barreto, and P. Santos. "Lyra2: efficient password hashing with high security against time-memory trade-offs," IEEE Transactions on Computers, vol. 65, No. 10, pp. 3096-3108, 2016, see also: http://eprint.iacr.org/2015/136. 2016.
C. Perera, A. Zaslaysky, P. Christen, and D. Georgakopoulos, "Context aware computing for the internet of things: A survey," IEEE Communications Surveys Tutorials, vol. 16, No. 1, pp. 414-454, 2014. 2014.
J. Harding, G. Powell, R. Yoon, J. Fikentscher, C. Doyle, D. Sade, M. Lukuc, J. Simons, and J. Wang, "Vehicle-to-vehicle communications: Readiness of V2V technology for application," National Highway Traffic Safety Administration, Washington, DC, USA, Tech. Rep. DOT HS 812 014, 2014. 2014.
S. Chen, J. Hu, Y. Shi, Y. Peng, J. Fang, R. Zhao, and L. Zhao, "Vehicle-to-everything (v2x) services supported by LTE-based systems and 5G," IEEE Communications Standards Magazine, vol. 1, No. 2, pp. 70-76, 2017. 2017.
P. Papadimitratos, A. L. Fortelle, K. Evenssen, R. Brignolo, and S. Cosenza, "Vehicular communication systems: Enabling technologies, applications, and future outlook on intelligent transportation," IEEE Communications Magazine, vol. 47, No. 11, pp. 84-95, Nov. 2009. Nov. 2009.
NHTSA, "Federal Motor Vehicle Safety Standards; V2V Communication," National Highway Traffic Safety Administration, U.S. Department of Transportation (USDOT), Tech. Rep. 8, Jan. 2017. [Online]. Available: https://www.federalregister.gov/documents/2017/01/12/2016-31059/federal-motor-vehicle-safety-standards-v2v-communications Jan. 8, 2017.
D. Jiang and L. Delgrossi, "IEEE 802.11p: Towards an international standard for wireless access in vehicular environments," in IEEE Vehicular Technology Conference (VTC Spring), 2008, pp. 2036-2040. 2008.
F. Schaub, Z. Ma, and F. Kargl, "Privacy requirements in vehicular communication systems," in Proc. of the International Conference on Computational Science and Engineering, vol. 3. IEEE, 2009, pp. 139-145. 2009.

(56) References Cited

OTHER PUBLICATIONS

P. Cincilla, O. Hicham, and B. Charles, "Vehicular PKI scalability-consistency tradeoffs in large scale distributed scenarios," in IEEE Vehicular Networking Conference (VNC), Dec. 2016, pp. 1-8. Dec. 2016.

J. Petit, F. Schaub, M. Feiri, and F. Kargl, "Pseudonym schemes in vehicular networks: A survey," IEEE Communications Surveys Tutorials, vol. 17, No. 1, pp. 228-255, 2015. 2015.

M. Khodaei, H. Jin, and P. Papadimitratos, "Towards deploying a scalable & robust vehicular identity and credential management infrastructure," in 2014 IEEE Vehicular Networking Conference (VNC), Dec. 2014, pp. 33-40. Dec. 2014.

V. Kumar, J. Petit, and W. Whyte, "Binary hash tree based certificate access management for connected vehicles," in Proc. of the 10th ACM Conference on Security and Privacy in Wireless and Mobile Networks, ser. WiSec'17. New York, NY, USA: ACM, 2017, pp. 145-155. 2017.

M. Simplicio, E. Cominetti, H. K. Patil, J. Ricardini, and M. Silva, "The unified butterfly effect: Efficient security credential management system for vehicular communications," IACR eprint archive: https://eprint.iacr.org/2018/089.pdf, 2018 2018.

IEEE, IEEE Standard Specifications for Public-Key Cryptography—Amendment 1: Additional Techniques, IEEE Computer Society, 2004. 2004.

Federal Information Processing Standard (FIPS 186-4)—Digital Signature Standard (DSS), National Institute of Standards and Technology, U.S. Department of Commerce, National Institute of Standards and Technology, U.S. Department Jul. 2013.

S. Josefsson and I. Liusvaara, "RFC 8032—Edwards-Curve Digital Signature Algorithm(EdDSA)," https://tools.ietf.org/html/rfc8032, Jan. 2017. Jan. 2017.

ETSI, "TR 102 941—Intelligent Transport Systems (ITS); Security; Trust and Privacy Management," European Telecommunications Standards Institute, Tech. Rep., Jun. 2012. Jun. 2012.

IEEE, "IEEE standard for wireless access in vehicular environments—security services for applications and management messages—amendment 1," IEEE Std 1609.2a-2017 (Amendment to IEEE Std 1609.2-2016), pp. 1-123, Oct. 2017. Oct. 2017.

D. Förster, F. Kargl, and H. Löhr, "PUCA: A pseudonym scheme with strong privacy guarantees for vehicular ad-hoc networks," Ad Hoc Networks, vol. 37, pp. 122-132, 2016, Special Issue on Advances in Vehicular Networks. 2016.

M. Raya, P. Papadimitratos, I. Aad, D. Jungels, and J.-P. Hubaux, "Eviction of misbehaving and faulty nodes in vehicular networks," IEEE Journal on Selected Areas in Communications, vol. 25, No. 8, 2007. 2007.

J. J. Haas, Y.-C. Hu, and K. P. Laberteaux, "Design and analysis of a lightweight certificate revocation mechanism for vanet," in Proceedings of the sixth ACM international workshop on VehiculAr InterNETworking. ACM, 2009, pp. 89-98. 2009.

E. Verheul, "Activate later certificates for V2X—combining ITS efficiency with privacy," Cryptology ePrint Archive, Report 2016/1158, 2016. [Online]. Available: http://eprint.iacr.org/2016/1158 2016.

K. Alheeti, A. Gruebler, and K. McDonald-Maier, "An intrusion detection system against malicious attacks on the communication network of driverless cars," in 12th Annual IEEE Consumer Communications and Networking Conference (CCNC), Jan. 2015, pp. 916-921. Jan. 2015.

Certicom, "Sec 4 v1.0: Elliptic curve Qu-Vanstone implicit certificate scheme (ECQV)," Certicom Research, Tech. Rep., 2013, http://www.secg.org/sec4-1.0.pdf. 2013.

NIST, Special Publication 800-131A Rev. 1—Transitions: Recommendation for Transitioning the Use of Cryptographic Algorithms and Key Lengths, National Institute of Standards and Technology, U.S. Department of Commerce, Gaithersburg, MD, USA, Nov. 2015, dOI:10.6028/NIST.SP.800-131Ar1. Nov. 2015.

D. Aranha and C. Gouvêa. RELIC is an Efficient Library for Cryptography. https://github.com/relic-toolkit/relic, 2018. 2018.

Daniel Brown, Robert Gallant, and Scott Vanstone. "Provably secure implicit certificate scheme,". Financial Cryptography, pp. 156-165, Berlin, Heidelberg, 2002. Springer. 2002.

Jean-Sébastien Coron, Marc Joye, David Naccache, and Pascal Paillier, "Universal padding schemes for RSA," Advances in Cryptology (CRYPTO'02), pp. 226-241, London, UK, UK, 2002. Springer. 2002.

Gemalto. SafeNet Luna Network HSM—product brief. https://safenet.gemalto.com/, 2018. 2018.

A. Iyer, A. Kherani, A. Rao, and A. Karnik, "Secure V2V communications: Performance impact of computational overheads," IEEE INFOCOM Workshops, pp. 1-6, Apr. 2008. Apr. 2008.

Kristin E Lauter and Katherine E Stange, "The elliptic curve discrete logarithm problem and equivalent hard problems for elliptic divisibility sequences,". Selected Areas in Cryptography (SAC'08), pp. 309-327. Springer, 2008. 2008.

M. Simplicio, E. Cominetti, H. Kupwade Patil, J. Ricardini, L. Ferraz, and M. Silva, "A privacy-preserving method for temporarily linking/revoking pseudonym certificates in vanets," 17th IEEE Int. Conf. On Trust, Security and Privacy In Computing and Communications (TrustCom'18), 2018. See also eprint.iacr.org/2018/185. 2018.

Paillier, "Public-key cryptosystems based on composite degree residuosity classes," Advances in cryptology—EUROCRYPT'99. Springer, 1999, pp. 223-238 1999.

NISTp256 (National Institute of Standards and Technology. (Jul. 1999) Recommended elliptic curves for federal government use. Available: http://csrc.nist.gov/groups/ST/toolkit/documents/dss/NISTReCur.doc Jul. 1999.

D. Bernstein, N. Duif, T. Lange, P. Schwabe, and B.-Y. Yang, "EdDSA for more curves," Journal of Cryptographic Engineering, vol. 2, No. 2, pp. 77-89, Sep. 2012, see also http://ed25519.cr.yp.to/eddsa-20150704.pdf. Sep. 2012.

Daniel J. Bernstein, Niels Duif, Tanja Lange, Peter Schwabe, and Bo-Yin Yang, "High-speed high-security signatures", In Cryptographic Hardware and Embedded Systems—CHES 2011, pp. 124-142, Berlin, Heidelberg, 2011, Springer Berlin Heidelberg 2011.

International Search Report and Written Opinion issued by the International Searching Authority dated Apr. 22, 2019 for PCT Application No. PCT/US2019/013084. pp. 1-16.

International Search Report and Written Opinion issued by the International Searching Authority dated May 14, 2019 for PCT Application No. PCT/US2019/016658. pp. 1-14.

Zheng et al., "Digital Signcryption or How to Achieve Cost (Signature & Encryption) Cost (Signature)+Cost (Encryption)," Advances in Cryptology—CRYPTO '97: 17th Annual International Cryptology Conference. Berlin, Heidelbery. 1997. pp. 1-15.

U.S. Appl. No. 62/561,667, filed Sep. 21, 2017.

U.S. Appl. No. 16/136,621, filed Sep. 20, 2018.

Written Opinion issued by the International Searching Authority dated Feb. 7, 2019 for PCT Application No. PCT/US2018/056784. pp. 1-14.

International Search Report issued by the International Searching Authority dated Feb. 7, 2019 for PCT Application No. PCT/US2018/056784. pp. 1-3.

Whyte et al., "A Security Credential Management System for V2V Communications," In 2013 IEEE Vehicular Networking Conference. Boston, Mass. Dec. 18, 2013. pp. 1-9. <URL: https://ieeexplore.ieee.org/document/6737583>.

Whyte et al., "A Security Credential Management System for V2V Communications," In CAMP Vehicle Safety Communications 3. Dec. 2013. pp. 1-37. <URL: http://www.ieee-vnc.org/2013/media/ieee_vnc_scms.pdf>.

\* cited by examiner

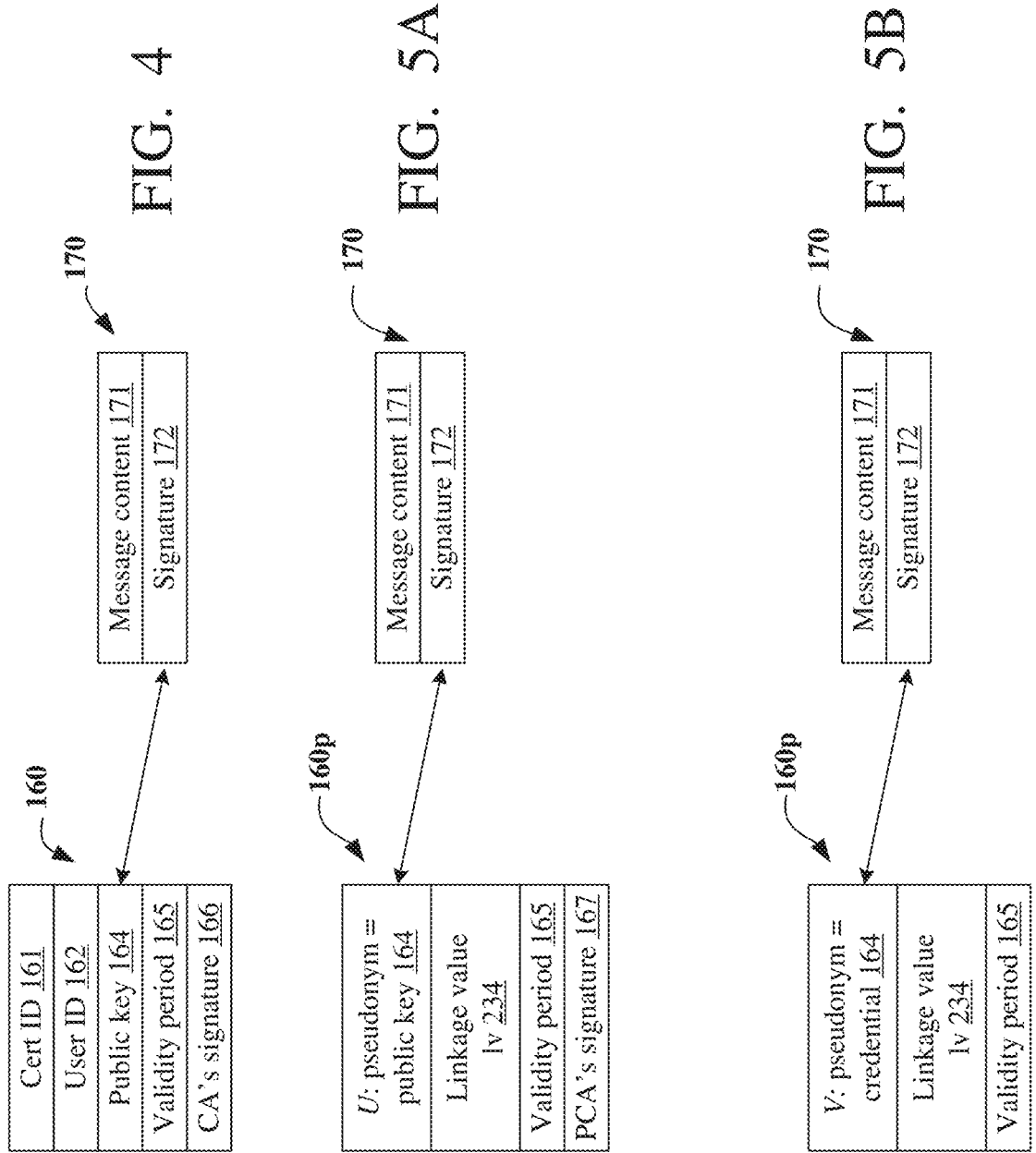

|  | Vehicle | → | RA | → | PCA | → | RA | → | Vehicle |
|---|---|---|---|---|---|---|---|---|---|
| SCMS | $514 \times 10^3$ | 96 | $\beta \cdot (504 \times 10^3)$ | $\beta \cdot (64)$ | $\beta \cdot (3.06 \times 10^6)$ | $\beta \cdot (\text{lcert} + 80)$ | 0 | $\beta \cdot (\text{lcert} + 80)$ | $\beta \cdot (6.67 \times 10^6)$ |
| eSCMS | $257 \times 10^3$ | 48 | $\beta \cdot (252 \times 10^3)$ | $\beta \cdot (32)$ | $\beta \cdot (3.31 \times 10^6)$ | $\beta \cdot (\text{lcert} + 48)$ | 0 | $\beta \cdot (\text{lcert} + 48)$ | $\beta \cdot (4.86 \times 10^6)$ |
| Ratio | 0.5 | 0.5 | 0.5 |  | 0.5 | 1.08 | $[0.73, 1]^*$ | 0 | $[0.73, 1]^*$ | 0.73 |

\* Assuming $\text{lcert} \geq 80$, which is close to the minimum for an implicit certificate (64 bytes for representing two EC points, plus a 16-byte identifier)

FIG. 10

| | Vehicle | → | RA | → | PCA | -RA→ | Vehicle |
|---|---|---|---|---|---|---|---|
| SCMS (explicit) 1210 | $s,$ $S = s \cdot G$ | $S, f_1$ | $\hat{S}_i = S + f_1(i) \cdot G$ $(0 \leq i < \beta)$ | $\hat{S}_i$ | $U_i = \hat{S}_i + r_i \cdot G$ $sig_i = Sign(u_p, \{U_i, meta, sig_i\})$ $cert_i = \{U_i, meta, sig_i\}$ $pkg = Enc(\hat{E}_i, \{cert_i, r_i\})$ $res = \{pkg, Sign(u_p, pkg)\}$ | res | $\hat{e}_i = e + f_2(i)$ $Ver(u_p, res)$ $\{cert_i, r_i\} = Dec(\hat{e}_i, pkg)$ $Ver(u_p, cert_i)$ $u_i = s + f_1(i) + r_i$ $u_i \cdot G \stackrel{?}{=} U_i$ |
| SCMS (implicit) 1214 | $e,$ $E = e \cdot G$ | $E, f_2$ | $\hat{E}_i = E + f_2(i) \cdot G$ | $\hat{E}_i$ | $V_i = \hat{S}_i + r_i \cdot G$ $cert_i = \{V_i, meta\}$ $sig_i = Hash(cert_i) \cdot r_i + u_p$ $pkg = Enc(\hat{E}_i, \{cert_i, sig_i\})$ $res = \{pkg, Sign(u_p, pkg)\}$ | | $\hat{e}_i = e + f_2(i)$ $Ver(u_p, res)$ $\{cert_i, sig_i\} = Dec(\hat{e}_i, pkg)$ $Ver(u_p, cert_i)$ $h_i = Hash(cert_i)$ $v_i = h_i \cdot (s + f_1(i)) + sig_i$ $U_i = v_i \cdot G \stackrel{?}{=} h_i \cdot V_i + u_p$ |
| (explicit) 1230 | $x,$ $X = x \cdot G$ | $X, f$ | $\hat{X}_i = X + f(i) \cdot G$ $(0 \leq i < \beta)$ | $\hat{X}_i$ | $U_i = \hat{X}_i + r_i \cdot G$ $sig_i = Sign(u, \{U_i, meta, sig_i\})$ $cert_i = \{U_i, meta, sig_i\}$ $pkg = Enc(\hat{X}_i, \{cert_i, r_i\})$ | pkg | $\hat{x}_i = x + f(i)$ $\{cert_i, r_i\} = Dec(\hat{x}_i, pkg)$ $Ver(u_p, cert_i)$ $u_i = \hat{x}_i + r_i$ $u_i \cdot G \stackrel{?}{=} U_i$ |
| (implicit) 1234 | | | | | $V_i = \hat{X}_i + r_i \cdot G$ $cert_i = \{V_i, meta\}$ $sig_i = Hash(cert_i) \cdot r_i + u_p$ $pkg = Enc(\hat{X}_i, \{cert_i, sig_i\})$ | | $\hat{x}_i = x + f(i)$ $\{cert_i, sig_i\} = Dec(\hat{x}_i, pkg)$ $Ver(u_p, cert_i)$ $h_i = Hash(cert_i)$ $v_i = h_i \cdot (x + f(i)) + sig_i$ $U_i = v_i \cdot G \stackrel{?}{=} h_i \cdot V_i + u_p$ |

FIG. 12

|  | Vehicle | → | RA | → | PCA | → | RA | → | Vehicle (RP)* | Vehicle (FP)* |
|---|---|---|---|---|---|---|---|---|---|---|
| SCMS (explicit) | $508 \times 10^3$ | 96 | $\beta \cdot (499 \times 10^3)$ | $\beta \cdot (64)$ | $\beta \cdot (3.27 \times 10^6)$ | $\beta \cdot (|cert|+80)$ | 0 | $\beta \cdot (|cert|+80)$ | $\beta \cdot (5.30 \times 10^6)$ | $\beta \cdot (3.23 \times 10^6)$ |
| ours (explicit) | $254 \times 10^3$ | 48 | $\beta \cdot (250 \times 10^3)$ | $\beta \cdot (32)$ | $\beta \cdot (2.86 \times 10^6)$ | $\beta \cdot (|cert|+48)$ | 0 | $\beta \cdot (|cert|+48)$ | $\beta \cdot (3.75 \times 10^6)$ | $\beta \cdot (2.73 \times 10^6)$ |
| Ratio: ours/SCMS | 0.5 | 0.5 | 0.5 | 0.5 | 0.88 | $[0.75, 1[$‡ | 0 | $[0.75, 1[$‡ | 0.71 | 0.85 |
| SCMS (implicit) | $508 \times 10^3$ | 96 | $\beta \cdot (499 \times 10^3)$ | $\beta \cdot (64)$ | $\beta \cdot (2.86 \times 10^6)$ | $\beta \cdot (|cert|+48)$ | 0 | $\beta \cdot (|cert|+48)$ | $\beta \cdot (5.74 \times 10^6)$ | $\beta \cdot (4.72 \times 10^6)$ |
| ours (implicit) | $254 \times 10^3$ | 48 | $\beta \cdot (250 \times 10^3)$ | $\beta \cdot (32)$ | $\beta \cdot (2.46 \times 10^6)$ | $\beta \cdot (|cert|+16)$ | 0 | $\beta \cdot (|cert|+16)$ | $\beta \cdot (4.19 \times 10^6)$ | $\beta \cdot (4.19 \times 10^6)$ |
| Ratio: ours/SCMS | 0.5 | 0.5 | 0.5 | 0.5 | 0.86 | $[0.67, 1[$‡ | 0 | $[0.67, 1[$‡ | 0.72 | 0.89 |

\* Assuming that ECDSA verification uses the PCA'S public signature key $u$ as a random (RP) or fixed (FP) point
‡ ignoring encryption overhead and assuming $|cert| > 48$, which is close to the minimum for a certificate (32 bytes for representing $U_i$ or $V_i$, plus 16-bytes for metadata such as the expiration date and vehicle identifier)

FIG. 13

CRYPTOGRAPHIC METHODS AND SYSTEMS FOR MANAGING DIGITAL CERTIFICATES

CROSS REFERENCE TO RELATED APPLICATIONS

The present application is a continuation of U.S. patent application Ser. No. 16/165,871, filed on 19 Oct. 2018, incorporated herein by reference, which claims priority to U.S. Provisional Patent Application No. 62/575,514, "SECURITY IN VEHICULAR COMMUNICATIONS," filed on 22 Oct. 2017, incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to secure communications, including transportation-related communications among cars, trucks, trains, and possibly other vehicles, as well as pedestrians' smartphones, traffic lights, and other infrastructure.

In recent times, there has been a surge in digital technologies embedded in physical objects, leading to what is today known as Internet of Things (IoT). This trend has also reached the automotive industry, which has shown a growing interest in exploring interaction models such as Vehicle-to-Vehicle (V2V), Vehicle-to-Infrastructure (V2I) and Vehicle-to-Pedestrian (V2P), collectively referred to as Vehicle-to-Everything (V2X) communications. V2X enables several applications aimed at improving transportation safety, efficiency, and human to machine interaction. For example, with V2X, vehicles can exchange or communicate information (e.g., for velocity, direction and brake status) that can help drivers keep a safe distance from other vehicles while maintaining a suitable speed.

Indeed, the U.S. Department of Transportation has initiated a "connected vehicles" program "to test and evaluate technology that will enable cars, buses, trucks, trains, roads and other infrastructure, and our smartphones and other devices to 'talk' to one another. Cars on the highway, for example, would use short-range radio signals to communicate with each other so every vehicle on the road would be aware of where other nearby vehicles are. Drivers would receive notifications and alerts of dangerous situations, such as someone about to run a red light as they [are] nearing an intersection or an oncoming car, out of sight beyond a curve, swerving into their lane to avoid an object on the road." U.S. Department of Transportation at https://www.its.dot.gov/cv_basics/cv_basics_what.htm. "Connected vehicles could dramatically reduce the number of fatalities and serious injuries caused by accidents on our roads and highways. [They] also promise to increase transportation options and reduce travel times. Traffic managers will be able to control the flow of traffic more easily with the advanced communications data available and prevent or lessen developing congestion. This could have a significant impact on the environment by helping to cut fuel consumption and reduce emissions."

While V2X technology and connected vehicles offer the promise of increased safety, traffic flow, efficiency, etc., the large scale deployment of such technologies also requires addressing some challenges, especially security and privacy concerns. In particular, V2X architectures are expected to (1) ensure that messages exchanged between vehicles are legitimate, banning misbehaving users, while (2) preserving the anonymity of honest users, so their movements cannot be easily tracked by other vehicles or by the system itself.

SUMMARY

This section summarizes some features of the invention. Other features may be described in the subsequent sections. The invention is defined by the appended claims, which are incorporated into this section by reference.

Some embodiments of the present invention provide certificate management techniques that reduce the processing and bandwidth costs of the certificate issuance process while providing high security.

BRIEF DESCRIPTION OF THE DRAWINGS

FIGS. 4, 5A, and 5B illustrate examples of digital certificates for message authentication.

FIG. 10 is a table showing estimated costs of some embodiments of the present invention relative to prior art.

FIGS. 12 and 13 are comparison tables showing methods for digital certificate generation according to prior art and to some embodiments of the present invention.

DETAILED DESCRIPTION OF SOME EMBODIMENTS

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent to one skilled in the art, however, that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Example Environment

Figure 1:
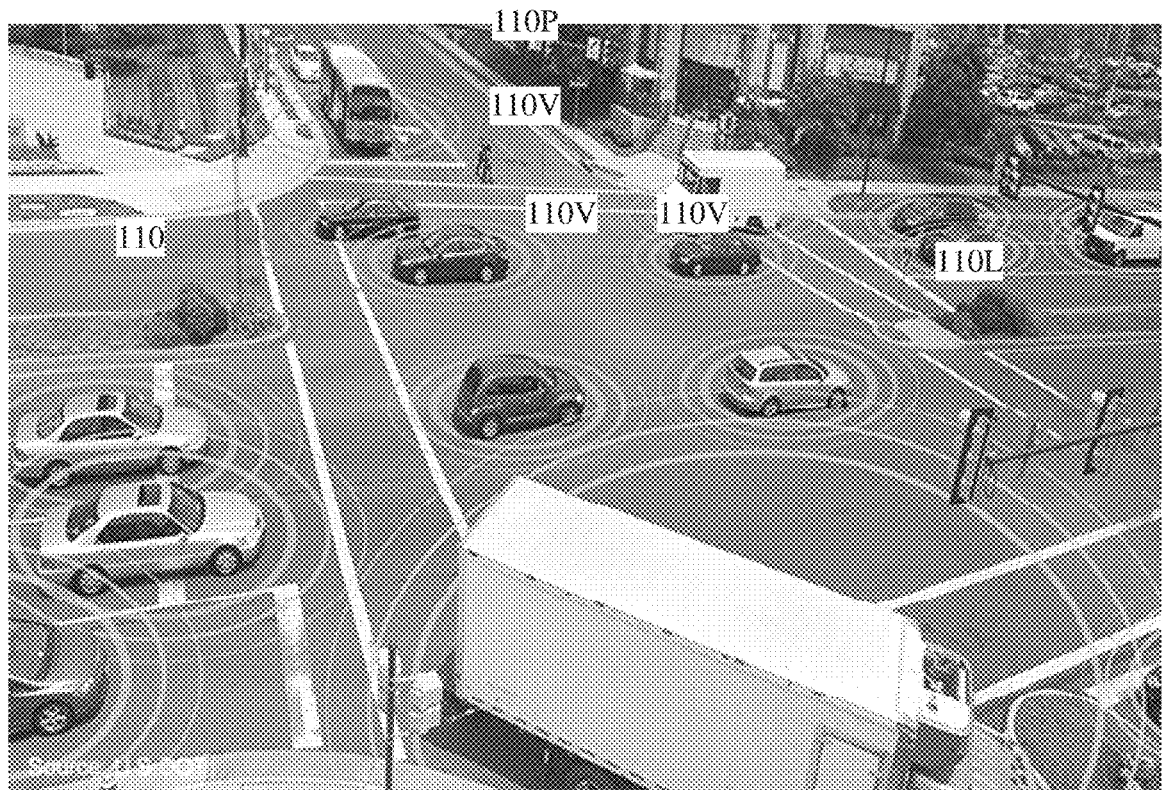
FIG. 1 illustrates an environment in which systems and methods of the present disclosure can operate.

FIG. 1 illustrates an environment in which systems and methods of the present disclosure can operate. FIG. 1 shows a busy intersection with various entities or objects, such as vehicles 110V (cars, trucks, and possibly other types, e.g. trains or bicycles), pedestrians 110P, roadside equipment 110L (e.g., traffic lights, along with hub or gateway for short and longer-range communications). Each of objects or entities 110 (110V, 110L, 110P, etc.) carries or incorporates equipment, such as smartphones, automotive information devices, or other computing devices. Using their respective computing devices, the objects or entities 110 communicate (e.g., wirelessly) to share information, coordinate, etc. Each vehicle 110V may, for example, broadcast its location, speed, acceleration, route, direction, weather information, etc. Such broadcasts can be used to obtain advance information on traffic jams, accidents, slippery road conditions, and allow each vehicle to know where the other vehicles are, and so on. In response, vehicle recipients of such information may alert their drivers, to advise the drivers to stop, slow down, change routes, take a detour, and so on. The traffic lights can be automatically adjusted based on the traffic conditions broadcast by the vehicles and/or other objects 110.

Figure 2:
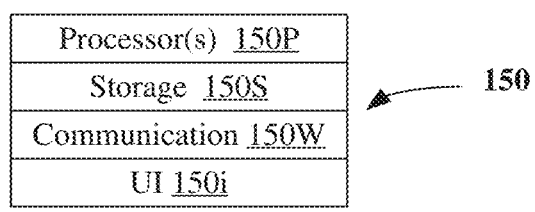
FIG. 2 is a block diagram of a computing device for use in the example environment.

FIG. 2 illustrates an embodiment of a computing device 150 used by the vehicles or other entities and objects, e.g., for communicating, coordinating, etc. in the environment of FIG. 1. As shown in FIG. 2, computing device 150 includes one or more computer processors 150P coupled to computer storage (memory) 150S, and wireless communication equipment 150W for radio communications. Operation of computing device 150 is controlled by processor 150P, which may be implemented as one or more central processing units, multi-core processors, microprocessors, microcontrollers, digital signal processors, field programmable gate arrays (FPGAs), application specific integrated circuits (ASICs), graphics processing units (GPUs), tensor processing units (TPUs), and/or the like in computing device 150P.

Memory 150S may be used to store software executed by computing device 100 and/or one or more data structures used during operation of computing device 150. Memory 150S may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, EEPROM, FLASH-EPROM, any other memory chip or cartridge, and/or any other medium from which a processor or computer is adapted to read.

Processor 150P and/or memory 150S may be arranged in any suitable physical arrangement. In some embodiments, processor 150P and/or memory 150S may be implemented on a same board, in a same package (e.g., system-in-package), on a same chip (e.g., system-on-chip), and/or the like. In some embodiments, processor 150P and/or memory 150S may include distributed, virtualized, and/or containerized computing resources. Consistent with such embodiments, processor 150P and/or memory 150S may be located in one or more data centers and/or cloud computing facilities. In some examples, memory 150S may include non-transitory, tangible, machine readable media that includes executable code that when run by one or more processors (e.g., processor 150P) may cause the computing device 150, alone or in conjunction with other computing devices in the environment, to perform any of the methods described further herein Computing device or equipment 150 may include user interface 150i, e.g. such as present in a smartphone, an automotive information device, or of some other type device, for use by pedestrians, vehicle drivers, passengers, traffic managers, and possibly other people.

Figure 3:
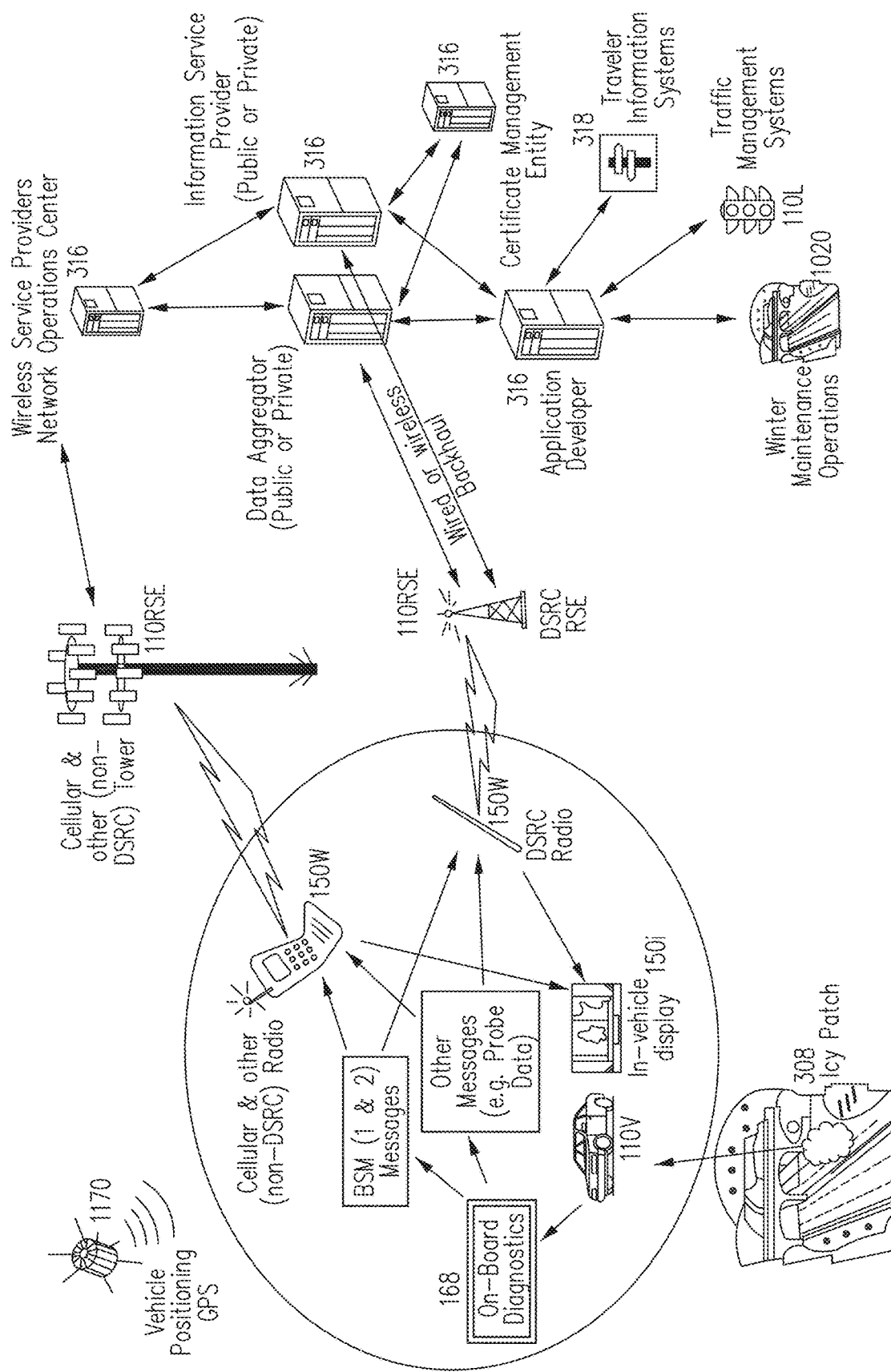
FIG. 3 is a representation of communications among vehicles and other equipment in the example environment.

FIG. 3 illustrates examples of communication schemes for entities or objects 110 or their computing devices 150 ("object 110", "user 110", and "equipment 150" may be used interchangeably herein when no confusion arises), interacting via V2X or connected vehicle technology. At a scene 308, a vehicle 110V encounters an icy road patch.

The vehicle 110V may include or incorporate one or more sensors-such as accelerometers, brake monitors, object detectors, LIDAR, etc.—for sensing conditions within and around vehicles 110V, such as sudden breaking, wheel spin, potential collisions, etc. Using these sensors, the vehicle 110V may, for example, detect the icy road patch at scene 308. The sensors supply information to computing device or equipment 150 (FIG. 2) so that it can take action according, e.g., by automatically applying brakes, adjusting steering, and/or notifying the user via a display 150i in case the user needs to react. The computing device 150 may comprise an on-board diagnostics module 168 for performing diagnostics or analysis, for example, on the information provided by the sensors.

Different pieces of equipment on the vehicle 110V communicate by exchanging Basic Safety Messages (BSM) and/or other messages with each other and other vehicles. The BSM messages are described in detail in Whyte et al., "A security credential management system for V2V communications," *IEEE Vehicular Networking Conference*, 2013, pp. 1-8, and CAMP, "Security credential management system proof-of-concept implementation—EE requirements and specifications supporting SCMS software release 1.1," *Vehicle Safety Communications Consortium, Tech. Rep.*, May 2016 (available: https:f/www.its.dot.gov/pilots/pdf/SCMS_POC_EE_Requirements.pdf), both of which are incorporated by reference.

A vehicle or other object 110 can obtain its location, for example, by using GPS satellites 1170 or cellular triangulation. The vehicle 110V may also include communication equipment 150W, which, in some embodiments, can include a Direct Short Range Communications (DSRC) radio and non-DSRC radio equipment such as a mobile phone. The vehicle may thus communicate through a cellular system or road side equipment (RSE) 110RSE directly, i.e., without intermediate network switches. The RSE may act like a gateway to other networks, e.g., the Internet. Using the communication equipment 150W, vehicle 110 can communicate BSM messages and other information to other vehicles, entities, or objects 110 in the V2X or connected vehicle environment. Thus, vehicle 110V/150 may inform the other parts of the environment of the icy patch at scene 308. Likewise, another vehicle 110 may be located in a scene 1020, and may alert other vehicles of winter maintenance operations at that scene.

A traffic management system 110L may comprise equipment—e.g., stoplights, crosswalk lights, etc. located in or near roads, highways, crosswalks, etc.—to manage or control traffic of vehicles, persons, or other objects and entities. Traffic management system 110L may include some of the same or similar equipment as vehicle 110V, including computing devices 150, sensors, user interfaces, communication equipment, etc.

Computer systems 316 process, aggregate, generate, or otherwise operate on information sent to or received from vehicles 110V, traffic management systems 110L, and other objects or entities 110 in the V2X or connected vehicle technology environment, along with their respective computing devices 150. Also shown is a traveler information system 318. Computer systems 316 in can be implemented or incorporate, for example, one or more servers. These computer systems 316, for example, provide or support location and map information, driving instructions, traffic alerts and warnings, information about roadside services (e.g., gas stations, restaurants, hotels, etc.). The computer systems 316 may receive information from the various vehicles, entities, and objects 110 in the environment, process the same, and communicate information or instructions throughout the environment in order to manage the objects, e.g., by adjusting signaling on traffic lights, rerouting traffic, posting alerts or warnings, etc.

This communication capability within the connected vehicle or V2X technology environment is potentially vulnerable to errors and abuse. A malicious user 110 (e.g., a vehicle operator or traffic manager) and/or defective equipment 150 may transmit false or incorrect information to other vehicles, so as to undesirably affect traffic. To protect from such misbehavior, the communications should be authenticated, for example, using a public-key infrastructure (PKI). In PKI, each vehicle 110V or other equipment is provided with a private key (e.g., for signing a message) and a public key (e.g., for signature verification). The public key is distributed to the public, but the private key is kept secret.

FIGS. 4, 5A, and 5B illustrate examples of digital certificates which can be used for message authentication in the connected vehicle or V2X technology environment. Referring to FIG. 4, a digital certificate 160 is shown.

Digital certificate 160 has a number of fields or parameters. In some embodiments, these include a certificate ID 161, a user ID 162 (e.g., a vehicle ID number or the user's email address), the vehicle's (or user's) public key 164, and possibly other parameters (called metadata), such as the certificate's validity period 165, an identification of the signature scheme, and maybe others. Certificate 160 also includes a signature 166 formed by a certificate authority (CA) over all the fields of the certificate except the signature itself. The CA may reside on or be implemented in computers 316 for example.

Digital certificate 160 can be issued to a vehicle 110V to authenticate the public key 164. The vehicle 110V attaches its certificate 160 to each message 170 transmitted by the vehicle. The message 170 includes message body or content 171, and a digital signature 172 generated by the vehicle using its private key. The message recipient uses the CA's public key to verify the signature 166 and thus authenticate the certificate 160 including the public key 164. The recipient then uses the public key 164 to verify the message signature 172 and thus authenticate the message. In some embodiments, the verification of the certificate's signature 166 and message signature 172 can also be combined (e.g., for better performance).

If the vehicle misbehaves (maliciously or due to a malfunction), its certificate 160 can be revoked. For example, the CA will not issue a new certificate after the expiration of validity period 165. Validity period 165 can be used by message recipients to detect expired certificates.

A disadvantage of this scheme is potentially compromising user privacy: if a vehicle's transmissions are intercepted, the vehicle can be tracked by tracking the certificate ID 161 or user ID 162 transmitted by the vehicle. To protect user privacy, the user can be issued multiple pseudonym certificates 160p (FIG. 5A) with random-looking strings ("pseudonyms") 164 instead of IDs 161 and 162. The vehicle then uses a pseudonym certificate instead of certificate 160 in message transmissions. The vehicle can automatically use different pseudonym certificates 160p for different messages 170 to avoid tracking.

FIG. 5A illustrates a pseudonym certificate 160p accompanying a message 170. The certificate is generated by a pseudonym certificate authority (PCA). The pseudonym 164, also denoted as U, acts as both the certificate ID and the public key. The certificate 160p may include validity period 165, an identification of the signature scheme, PCA signature 167, and maybe other parameters, similarly to certificate 160 of FIG. 4. Pseudonym certificate 160p also includes linkage value (lv) 234 used for certificate revocation as described below.

The vehicle attaches one of its pseudonym certificates 160p to each message 170 transmitted by the vehicle. The message recipient uses the PCA's public key to verify the PCA signature 167, and uses the pseudonym 164 to verify the message signature 172 and thus authenticate the message 170. In some embodiments, the verification of the certificate's signature 167 and message signature 172 can be combined (e.g., for better performance). Such pseudonym certificates are used in Security Credential Management System (SCMS), originally proposed in Whyte et al., and later extended in CAMP.

In a variation called "implicit certificate" (FIG. 5B), instead of a public key U, the pseudonym field 164 is "credential" data (or "public key reconstruction" data), denoted as V, allowing anyone having the PCA's public key to derive the certificate's public key U. (U is not stored in the certificate 160p.) See for example "Certicom. Sec 4 v 1.0: Elliptic curve Qu-Vanstone implicit certificate scheme (ECQV). Technical report, Certicom Research, 2013. http://www.secg.org/sec4-1.0.pdf", ("Certicom" below), incorporated herein by reference.

When a message recipient needs to verify the message signature 172, the message recipient first reconstructs the user's public key U from the pseudonym 164 (V) and the PCA public key, and then uses the user's public key U to verify the signature. Since this process uses the PCA public key, this process not only authenticates the message 170 as coming from a user possessing the certificate 160p, but also verifies the certificate 160p as authenticated by PCA 210. A separate PCA signature 167 is therefore unnecessary and is omitted, reducing the certificate size. See Certicom.

Security Credential Management System (SCMS)

Security Credential Management System (SCMS) is one of the most prominent among the various pseudonym-based security solutions for V2X. Indeed, SCMS is presently considered one of the leading vehicular public-key infrastructure (VPKI) candidate designs for protecting V2X—vehicle-to-vehicle (V2V) and vehicle-to-infrastructure (V2I)—communications in the United States. SCMS deals with revocable privacy while preventing any given certificate management entity from tracking devices 110/150 by the entity itself, i.e., without colluding with other system entities. By doing so, it copes with security needs of V2X while elegantly addressing a threat model in which the system's entities can be considered "honest-but-curious," i.e., they follow the correct protocols but may try to track vehicles if this can be done in an undetectable manner, as described in Khodaei et al., "The key to intelligent transportation: Identity and credential management in vehicular communication systems," *IEEE Vehicular Technology Magazine*, vol. 10, no. 4, pp. 63-69, December 2015, which is incorporated by reference.

General Notation

For convenience, Table I includes a list of the symbols and general notation adopted in this disclosure for the relevant environment including V2X, connected vehicle, and/or SCMS.

TABLE I

Symbols

| Symbol | Meaning |
|---|---|
| U | A vehicle's public key, different for each pseudonym certificate, and used as a pseudonym, placed in pseudonym a certificate |
| u | The private key corresponding to U |
| s, S | Private and public caterpillar keys for signature |
| e, E | Private and public caterpillar keys for encryption |
| $\hat{s}, \hat{S}$ | Private and public cocoon keys for signature |
| $\hat{e}, \hat{E}$ | Private and public cocoon keys for encryption |
| x, X | Private and public unified caterpillar keys |
| $\hat{x}, \hat{X}$ | Private and public unified cocoon keys |
| β | Number of cocoon keys in a batch of pseudonym certificates generated in response to a request to generate the pseudonym certificates |
| σ | Number of certificates valid in each time period |
| lv | Linkage value |
| enc(key, str) | Encryption of a bit string str with key key |
| hash(str) | Hash of str |

The notation $str_1 \| str_2$ is used to represent the concatenation of bit strings $str_1$ and $str_2$. The notation enc(key, str) denotes the encryption of a bit string str with key key, which can be done using standard block ciphers such as the Advanced Encryption Standard (AES), as described in more detail in NIST, *Federal Information Processing Standard (FIPS 197)—Advanced Encryption Standard (AES)*, National Institute of Standards and Technology, U.S. Department of Commerce, Gaithersburg, Md., USA, November 2001, available: http://csrc.nist.gov/publications/fips/fips197/fips-197.pdf. Similarly, the notation hash(str) denotes the hash of str, using some standard hash function such as SHA-2 or SHA-3, as described in more detail in NIST, *Federal Information Processing Standard (FIPS 180-4)—Secure Hash Standard (SHS)*, National Institute of Standards and Technology, U.S. Department of Commerce, Gaithersburg, Md., USA, August 2015, DOI:10.6028/NIST.FIPS.180-4, and NIST, *Federal Information Processing Standard (FIPS 202)—SHA-3 Standard: Permutation-Based Hash and Extendable-Output Functions*, National Institute of Standards and Technology, U.S. Department of Commerce, Gaithersburg, Md., USA, August 2015, DOI: 10.6028/NIST.FIPS.202, both of which are incorporated by reference herein.

The length of a given string str in bytes is denoted |str|. We denote by G the generator point of an elliptic curve group (written additively), denoted as "$G_E$".

In SCMS, each device (110/150) receives two types of certificates: an enrollment certificate 160, which has a long expiration time T and identifies a valid device in the system; and multiple pseudonym certificates 160p, each having a short validity (e.g., a few days), in such a manner that σ≥1 pseudonym certificates may be valid simultaneously. For protecting its privacy, a particular vehicle may then frequently change the pseudonym certificate employed in the vehicle's communications, thus avoiding tracking by nearby vehicles or by roadside units. In practice, it is useful to limit the value of σ to a small number to avoid "sybil-like" attacks (as described in detail in Douceur, "The Sybil attack," *Proceedings of 1st International Workshop on Peer-to-Peer Systems (IPTPS)*. Springer, January 2002 (Available: https://www.microsoft.com/en-us/research/publication/the-sybil-attack/), which is incorporated by reference), in which one vehicle poses as a platoon aiming to gain some advantage over the system (see Moalla et al., "Risk analysis study of ITS communication architecture," *3rd International Conference and The Network of the Future*, 2012, pp. 2036-2040, which is incorporated by reference). For example, such a fake platoon could end up receiving preferential treatment from traffic lights programmed to give higher priority to congested roads.

Example SCMS Architecture

Figure 6:
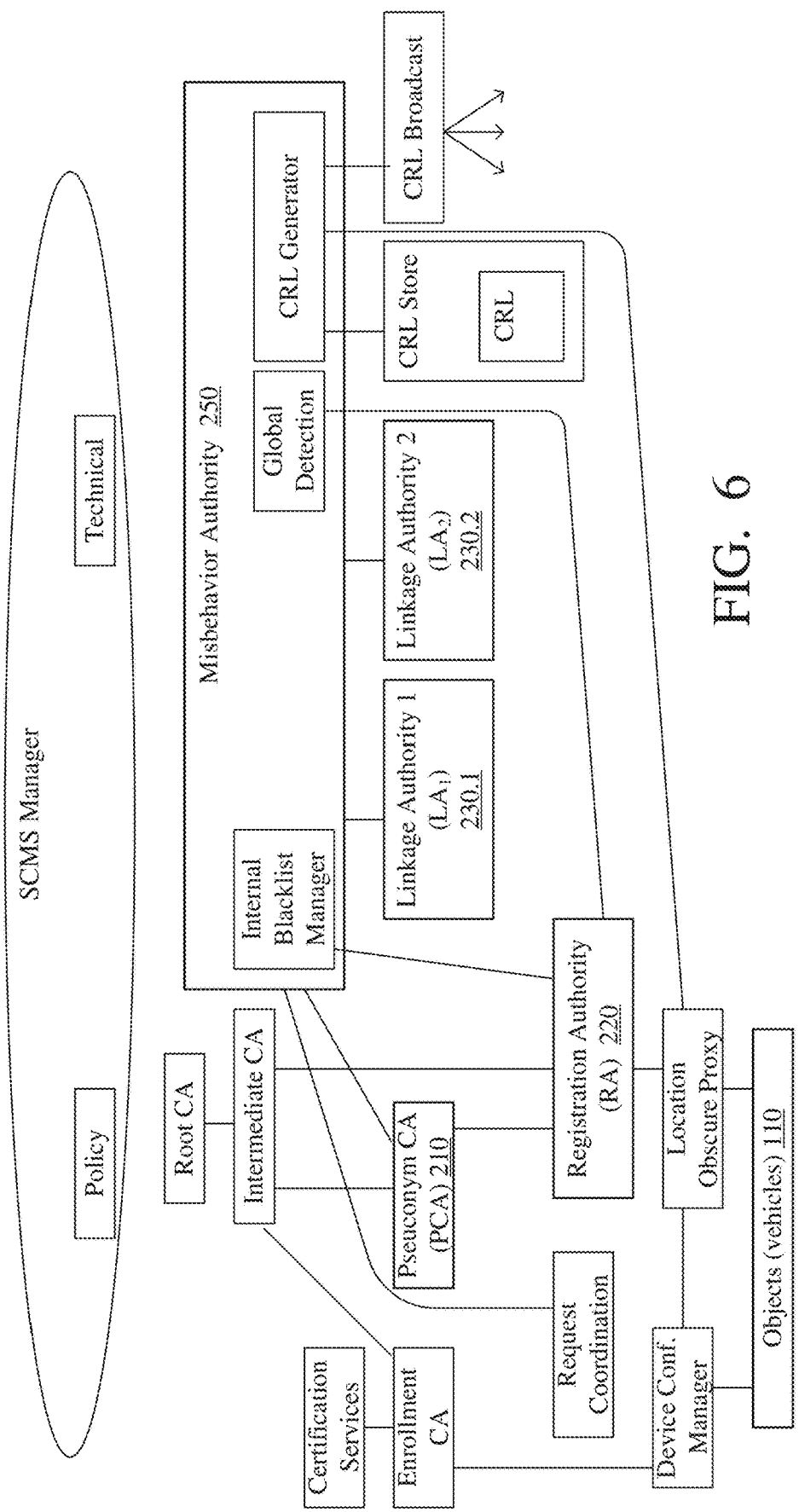
FIG. 6 is a block diagram illustrating computer system architecture suitable for digital certificate management.

FIG. 6 illustrates an exemplary computer system architecture environment for SCMS.

SCMS was designed to allow the distribution of multiple pseudonym certificates to vehicles in an efficient manner, while providing mechanisms for easily revoking them in case of misbehavior by their owners.

In SCMS, a Registration Authority (RA) 220 provides batches of pseudonym certificates 160p to authorized vehicles or objects 110/150. A batch is generated from a single request received from a vehicle, in the butterfly key expansion process. RA 220 validates the vehicle requests by the vehicles' enrollment certificates 160. In addition to an enrollment certificate, each request includes some public keys (other than 164) generated by the vehicle for the pseudonym certificate provisioning process. These public keys are labeled as 710 in FIG. 7 discussed below. RA 220 then shuffles together the keys 710 belonging to different users before individually sending them to a Pseudonym Certificate Authority (PCA) 210. As such, the PCA 210 cannot link a group of requests to a same object 110/device 150. The PCA 210, in turn, creates valid certificates 160p, and encrypts and signs them before delivering them to the RA for forwarding to the devices 110/150. Since the certificates 160p are encrypted, the RA cannot link a pseudonym certificate 160p to a device 110/150. Unless the PCA and RA collude, they are unable to link a certificate 160p to its owner 110/150.

Linkage Authority (LA) 230, or rather linkage authorities $LA_1$ and $LA_2$—also labeled as 230.1 and 230.2—generate random-like bitstrings that are combined to create a linkage value (lv 234 in FIGS. 5A, 5B) added to pseudonym certificates 160p so that the pseudonym certificates can be efficiently revoked. The lv values are different for different pseudonym certificates, but they can be linked together for a given enrollment certificate 160. See e.g. U.S. patent application No. 62/561,667, filed 21 Sep. 2017, incorporated herein by reference; U.S. patent application Ser. No. 16/136,621, filed 20 Sep. 2018, incorporated herein by reference; and Marcos A. Simplicio Jr. et al., "A privacy-preserving method for temporarily linking/revoking pseudonym certificates in vehicular networks", https://eprint.iacr.org/2018/185.pdf, 2018, incorporated herein by reference.

Misbehavior Authority (MA) 250 obtains a misbehaving device's certificate 160p and uses the certificate's lv 234 and data obtained from the RA and PCA to revoke all of the same device's certificates 160p.

In some embodiments, each of RA 220, PCA 210, LAs 230, and MA 250 can be implemented with or incorporate one or more computing devices (e.g., computing device 150 or computer systems 316).

SCMS's Butterfly Key Expansion

Figure 7:
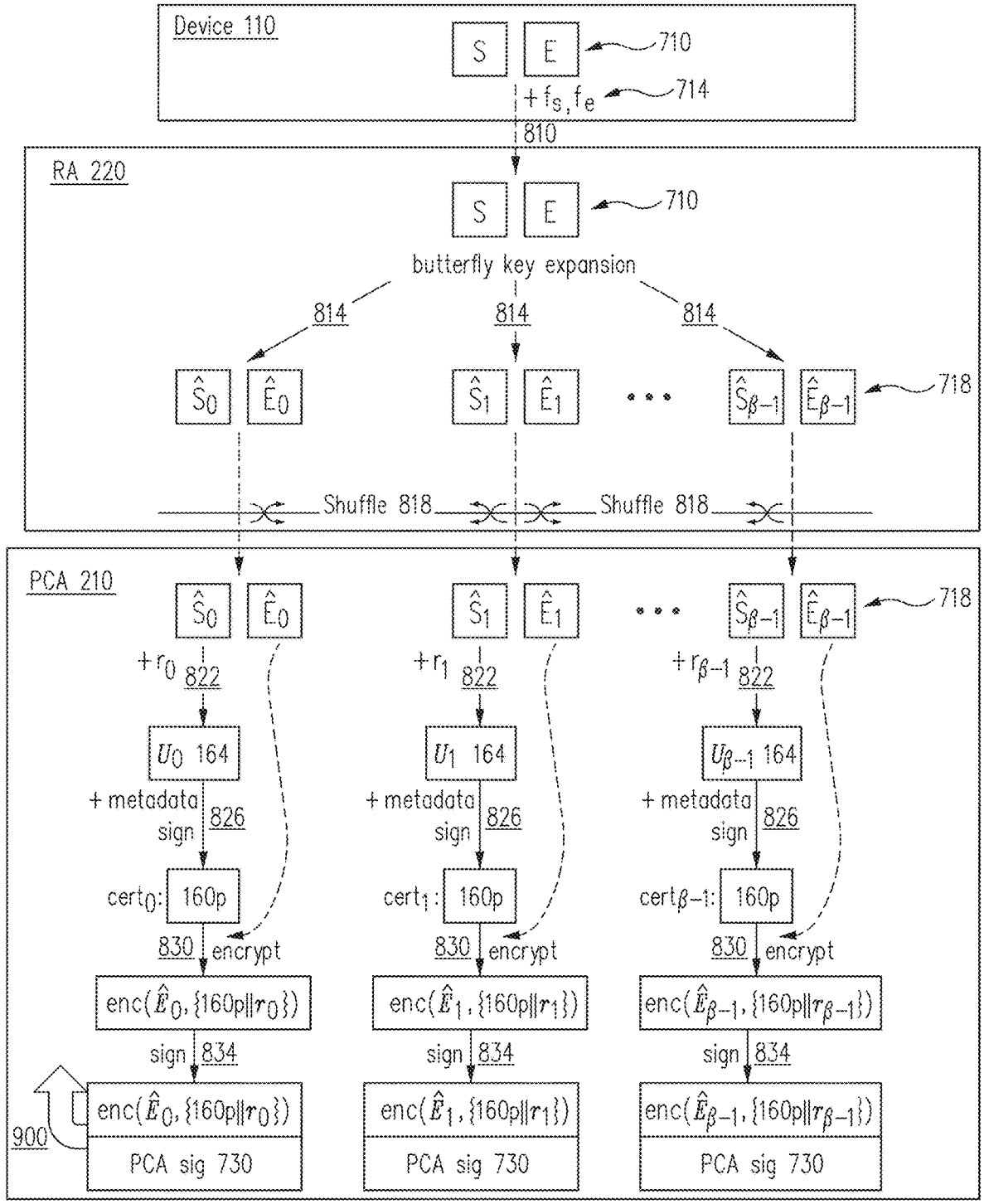
FIGS. 7 and 8 are flowcharts that illustrate prior art processes for generating digital certificates.

The pseudonym certification provisioning process in SMCS provides an efficient mechanism for devices 110 to obtain arbitrarily large batches of (short-lived) certificates 160p with a small-sized request message. The process is illustrated in FIG. 7. First, the requesting device 110/150 generates two "caterpillar" private/public key pairs 710:

$(s, S = s \cdot G)$ and $(e, E = e \cdot G)$

The private keys s and e should be random. The keys are generated using elliptic curve cryptography. The keys (s,S) relate to generation of pseudonyms 164 (FIGS. 5A, 5B), and are called "signature keys" because the pseudonyms 164 are used for message authentication via signature verification as described above. The keys (e,E) relate to pseudonym certificate encryption performed to hide the pseudonyms from the RA as described below; these keys are called "encryption keys".

At step 810, the device 110 requests the RA to generate some predefined number β of pseudonym certificates 160p. The request sent to the RA includes the public caterpillar keys S and E, shown at 710. In addition to keys 710, the request includes data defining two suitable pseudorandom functions (PRF) 714, denoted $f_s$ and $f_e$. (In some embodiments, the function-defining data may be the seeds of these functions; the functions' outputs can be computed from the seeds. Alternatively, while less efficient, the function-defining data may include the entire description of the PRFs, including the description of the computational algorithms for the PRFs.)

The RA may receive such requests from different devices 110, and generates β pseudonym certificates 160p for each device as follows. For each request, the corresponding keys S and E are employed by the RA, at step 814, for generating public cocoon keys 718. Specifically, at step 814, the key S is used in the generation of β public cocoon signature keys:

$\hat{S}_i = S + f_s(i) \cdot G$ for all i such that 0≤i<β. Similarly, at the same step 814, the RA uses the key E for generating β public cocoon encryption keys:

$\hat{E}_i = E + f_e(i) \cdot G$

Pairs of cocoon keys 718, i.e. $(\hat{S}_i, \hat{E}_i)$, from different devices 110 are then shuffled together by RA 220 (step 818) and sent individually or in batch to PCA 210 for the generation of the corresponding pseudonym certificates 160p. Each pair of cocoon keys is accompanied by the corresponding metadata, such as validity period 165 and data required for computation of linkage value (lv) 234; see FIGS. 4, 5A, 5B.

Figure 8:
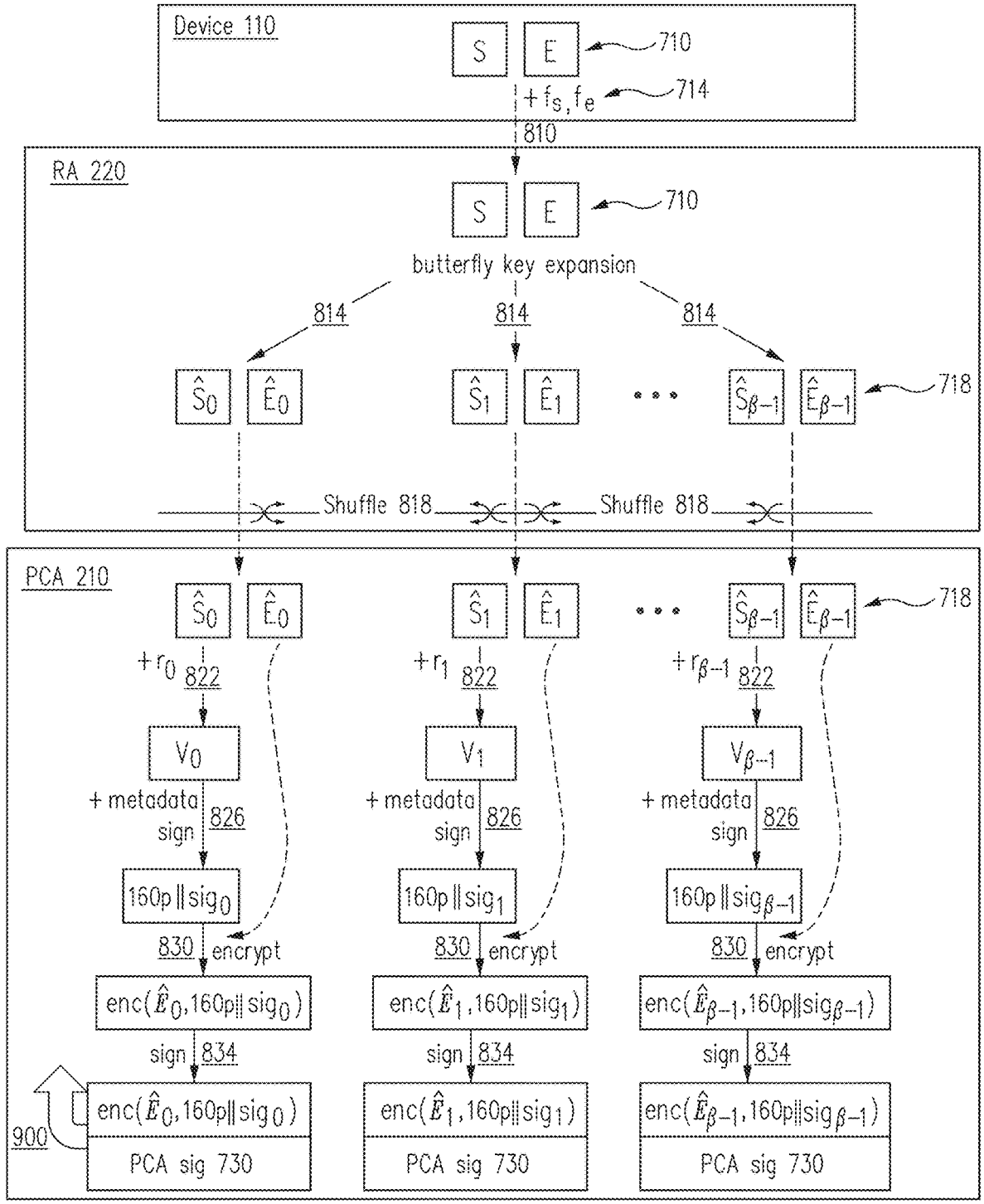

For each pair of cocoon keys $(\hat{S}_i, \hat{E}_i)$, the PCA can either create an explicit pseudonym certificate 160p (FIG. 5A) using the method of FIG. 7, or engage in an implicit certification process (FIG. 5B and Certicom) as illustrated in FIG. 8. The explicit or implicit certificate 160p is encrypted by the PCA and sent to the RA (step 900 in FIGS. 7, 8)). The RA "un-shuffles" the pseudonym certificates, and sends each pseudonym certificate to the corresponding (associated) device 110. Each device's β pseudonym certificates are sent to the device in batch.

For the explicit process (FIGS. 5A, 7), the PCA computes, at step 822, a random value $r_i$ and generates the certificate's public signature key (pseudonym) 164 according to the following equation (Eq. 1):

$$U_i = \hat{S}_i + r_i \cdot G \quad (\text{Eq. 1})$$

At step 826, the PCA forms the certificate 160p, also shown as $cert_i$, by: (1) combining $U_i$ with the metadata, e.g. the certificate's validity period 165 and the linkage value (lv) 234; and (2) digitally signing the combination to form the signature 167 (FIG. 5A).

The PCA then encrypts the certificate 160p together with the value of $r_i$, using the corresponding cocoon key $\hat{E}_i$ (step 830). The encrypted package (certificate 160p and value $r_i$) is signed again by the PCA (step 834) using the PCA's private signature key. The signature is shown at 730.

The result, i.e. the encrypted and signed package, is sent to the RA (step 900). The RA forwards the result to the requesting device 110.

Only the requesting device 110 can decrypt the value:

$enc(\hat{E}_i, 160p \| r_i)$ (see step 834) because only the requesting device 110 knows the private key corresponding to the cocoon key $\hat{E}_i$. This private key is given by the following equation (Eq. 2):

$$\hat{e}_i = e + f_e(i) \quad (\text{Eq. 2})$$

Therefore, only the device 110 can learn the pseudonym $U_i$ (as part of certificate 160p) and compute the corresponding private signature key:

$$u_i = s + r_i + f_s(i) \quad (\text{Eq. 3})$$

The device 110 can also verify the signature keys $u_i$, $U_i$ by checking that:

$$U_i = u_i \cdot G \quad (\text{Eq. 4})$$

Device 110 also verifies the PCA signature 730 to prevent the Man-in-the-Middle attack by the RA as described below.

For implicit certificates 160p, this process is as follows (see FIG. 8). The cocoon key generation (steps 810, 814, 818) is the same as for the explicit certificates. Then at step 822, the PCA computes a random $r_i$, and computes the credential 164:

$$V_i = \hat{S}_i + r_i \cdot G \quad (\text{Eq. 5})$$

Then at step 826, the PCA creates the implicit certificate 160p, also denoted $cert_i$, as:

$$cert_i = (V_i, meta)$$

i.e.

$$cert_i = V_i \| meta$$

where "meta" is the metadata (including validity period 165 etc.).

Also at step 826, the PCA signs this certificate to obtain the signature $sig_i$ as follows:

$$sig_i = h_i \cdot r_i + u_{PCA} \quad \text{(Eq. 6)}$$

where $h_i = Hash(cert_i)$, and $u_{PCA}$ is the PCA's private signature key.

The remaining steps of the certificate generation are similar to FIG. 7. Specifically, the PCA encrypts the certificate 160p together with the signature value of $sig_i$, using the corresponding cocoon key $\hat{E}_i$ (step 830). The encrypted package (certificate 160p and value $sig_i$) is signed by the PCA (step 834) using the PCA's private signature key. The signature is shown at 730. At step 900, the result (the encrypted structure and the signature 730) is sent to the requesting device 110 via the RA 220.

The device 110 verifies the PCA signature 730, decrypts the package $cert_i \| sig_i$, and computes:

$$h_i = Hash(cert_i) \quad \text{(Eq. 7)}$$

Device 110 then sets its own private signature key to:

$$u_i = h_i \cdot (s + f_s(i)) + sig_i \quad \text{(Eq. 8)}$$

whereas the corresponding public signature key takes the form:

$$U_i = u_i \cdot G \quad \text{(Eq. 9)}$$

The device 110 can then verify the validity of the public key $U_i$ by ascertaining that $$U_i = h_i \cdot V_i + U_{PCA} \quad \text{(Eq. 10)}$$

where $U_{PCA}$ is the PCA's public signature key corresponding to $u_{PCA}$.

Whichever certificate model is adopted, at step 834 of FIGS. 7 and 8, the encrypted PCA response is signed using the PCA's own private signature key $u_{PCA}$, aiming to prevent an "honest-but-curious" RA from engaging in a Man-in-the-Middle (MitM) attack. Namely, without this signature 730, a MitM attack by the RA could be performed as follows: (1) instead of $\hat{E}_i$, the RA sends to the PCA, at step 818, a fake cocoon encryption key $\hat{E}_i^* = z \cdot G$, for an arbitrary value of z; (2) at step 900, the RA decrypts the PCA's response using z, learning the pseudonym $U_i$ (FIG. 7) or $V_i$ (FIG. 8); and (3) the RA re-encrypts the certificate with the correct $\hat{E}_i$, sending the result to the device, which proceeds with the protocol as usual. But if the PCA generates signature 730 and device 110 verifies the signature 730 on the RA's response, the attack would fail because the RA cannot provide a valid signature 730 for the re-encrypted certificate generated in step (3).

Independently of the type of certificate adopted (explicit or implicit), the user's privacy is protected in this process as long as the RA and PCA do not collude. After all, the shuffling of public cocoon keys performed by the RA (step 818) prevents the PCA from learning whether or not any keys 718 belong to a same device. Unlinkability of public keys $U_i$ (FIG. 7) or $V_i$ (FIG. 8) to the devices for the RA, in turn, is also obtained because the latter does not learn the value of $U_i$ or $V_i$ randomized by the PCA using $r_i$.

Albeit quite efficient, especially from the perspective of devices 110, this process can be further optimized. Specifically, in some embodiments, the original SMCS certificate provisioning protocol is improved in terms of processing costs and bandwidth usage as further discussed herein.

Unified Butterfly Key Expansion Process

In FIGS. 7 and 8, the butterfly key expansion (step 814) is executed twice by the RA during the pseudonym certification provisioning process: once for the signature keys $\hat{S}_i$ and once for the encryption keys $\hat{E}_i$. As a result, the device 110 needs to send to the RA two caterpillar keys (S and E) at step 810, as well as the corresponding pseudorandom functions ($f_s$ and $f_e$), for the computation of the corresponding cocoon keys ($\hat{S}_i$ and $\hat{E}_i$, where $0 \le i \le \beta$). In addition, the PCA not only encrypts the certificate (step 830) but also signs the resulting encrypted package (step 834) to avoid manipulation by the RA. This extra signature leads to additional overheads in multiple places: on the PCA, for the computation and transmission of the extra signature 730; on the RA, for its reception and re-transmission; and on the end device 110, for the signature reception and verification, besides the verification of the certificate's signature itself ((Eq. 4) or (Eq. 10)).

According to some embodiments of the present invention, the generation and usage of the caterpillar keys can be done in a unified manner, leading to better efficiency without loss of security or functionality.

Examples of Explicit Certificate Process

Figure 9A:
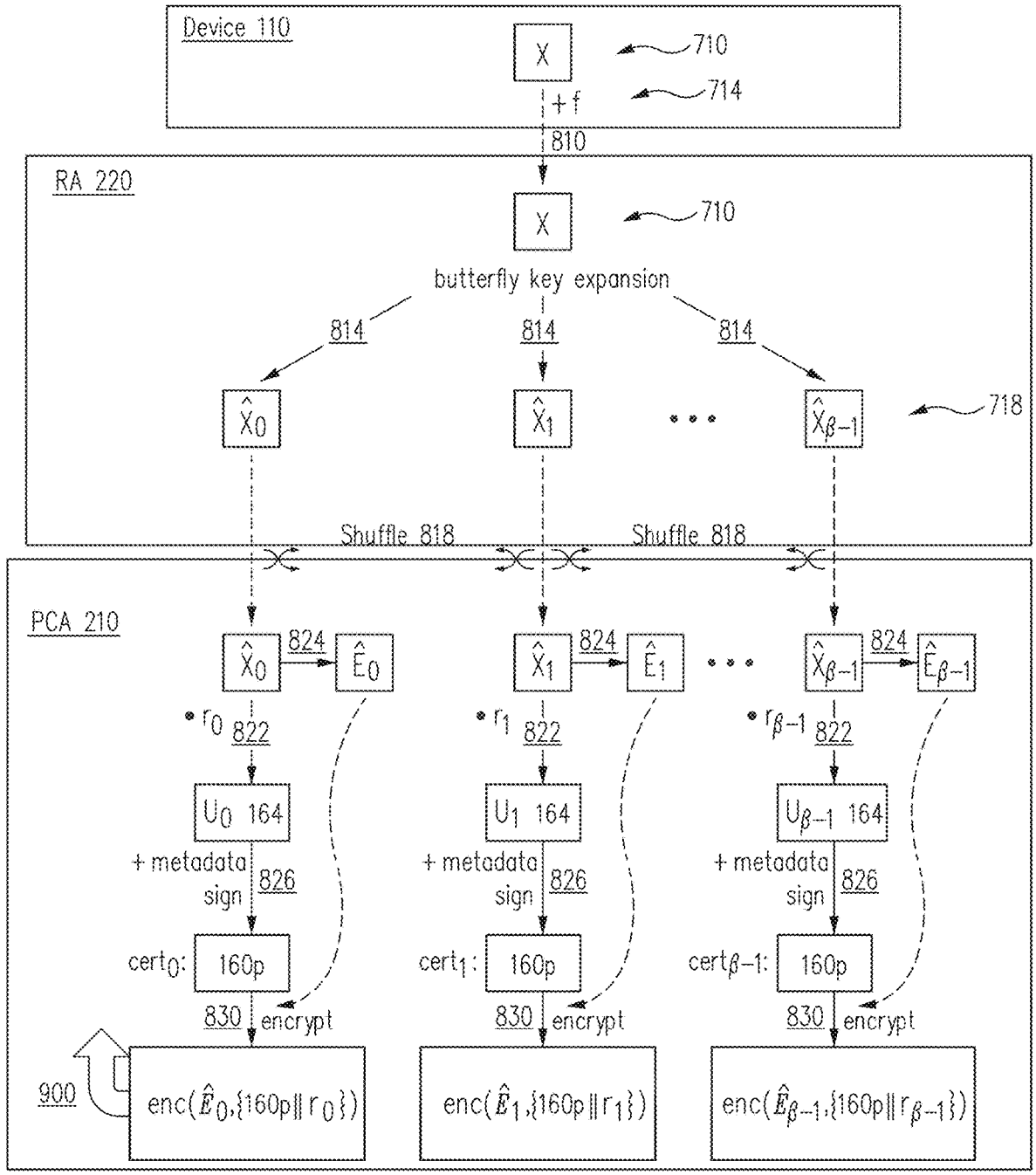
FIGS. 9A and 9B are flowcharts that illustrate processes used in some embodiments of the present invention to generate digital certificates.
Figure 9B:
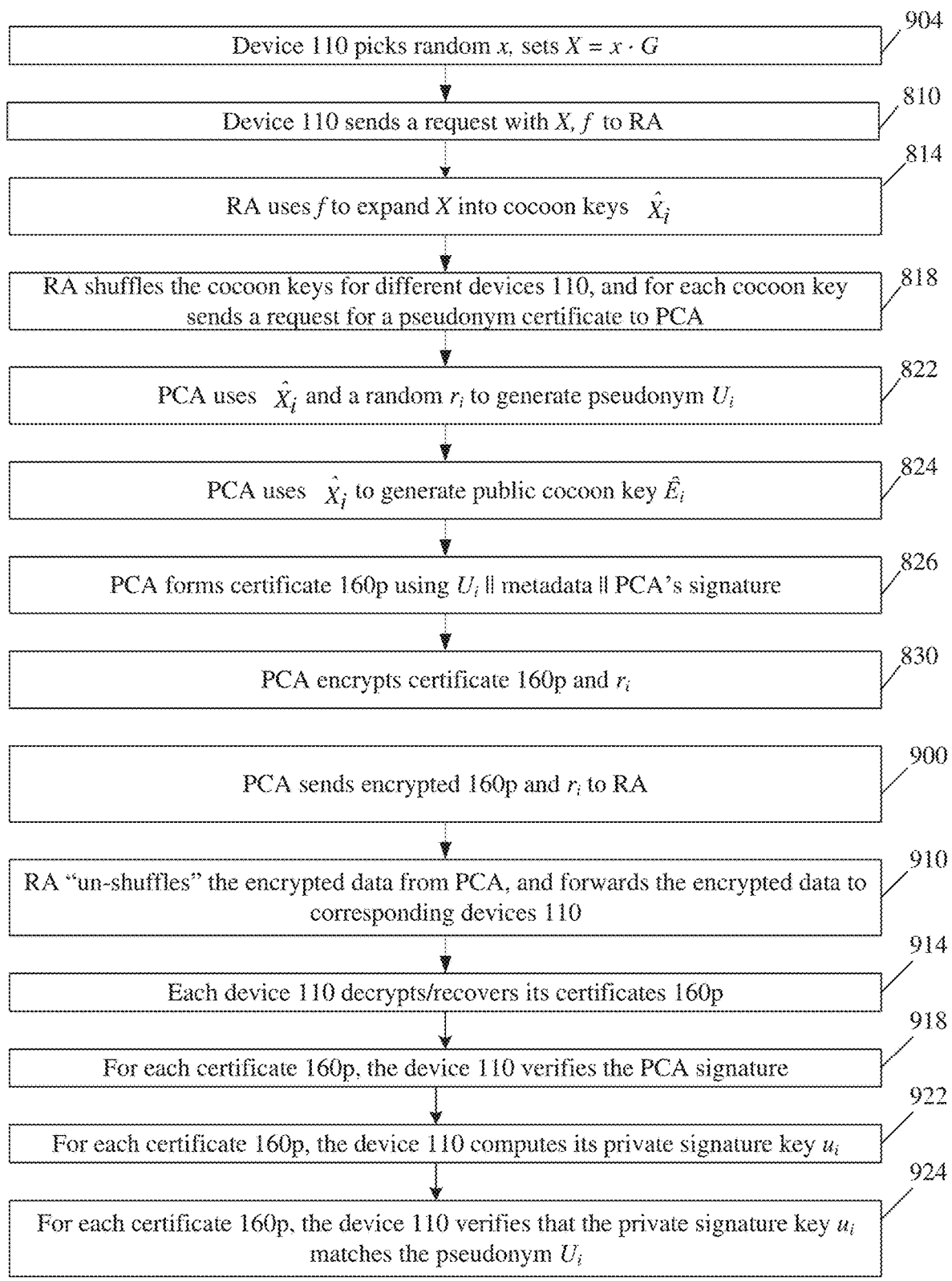

One embodiment of the present invention is depicted in FIGS. 9A and 9B. First (step 904), the requesting device 110 generates only a single caterpillar private/public key pair 710: $(x, X = x \cdot G)$. As in SCMS, the private key x should be randomly generated. The public key X will be used by the PCA for encrypting the certificate 160p and, after being randomized by the PCA, for creating the public key or pseudonym 164 that will be enclosed in the certificate as described below (step 824).

At step 810, the device 110 requests the RA to generate some predefined number $\beta$ of pseudonym certificates 160p. The device request sent by the device to the RA includes a unique ID ("device request ID"), a unique device ID, the public unified caterpillar key X, and data defining a suitable pseudorandom function (PRF) 714, shown simply as $f$. The function $f$ can be the same as $f_s$ or $f_e$ in SCMS. A copy of each device request is stored by the device in its memory.

At step 814, the RA generates $\beta$ public unified cocoon signature keys for each device (similarly to SCMS):

$$\hat{X}_i = X + f(i) \cdot G \quad \text{(Eq. 11)}$$

At step 818, the RA shuffles these cocoon keys for different devices, and for each cocoon key $\hat{X}_i$ the RA sends a ("RA request") for a pseudonym certificate 160p to PCA 210. The RA requests from different devices 110 can be sent to the PCA in batch, but this is not necessary.

For each RA request, the RA generates a unique request ID ("RA request ID"), and creates a data structure ("RA request data structure") containing the RA request ID, the cocoon key index i (see equation (Eq. 11)), and the associated device request. The RA request ID is provided to the PCA with the request. The device ID is not provided to the PCA, so the PCA cannot associate the request with the device. Also, the PCA cannot determine whether different requests are associated with the same or different devices.

For each cocoon key $\hat{X}_i$, the PCA can either create an explicit or implicit pseudonym certificate 160p. FIGS. 9A, 9B illustrate a process for explicit certificates. In either case, the explicit or implicit certificate 160p will later be encrypted by the PCA and sent to the RA (step 900). Each encrypted pseudonym certificate will be accompanied by the request ID, allowing the RA to "un-shuffle" the pseudonym certificates, i.e. associate each encrypted package with the device, and send the encrypted package to the associated device. Optionally, each device's β pseudonym certificates can be sent to the device in batch.

For the explicit certificates, at step 822, the PCA generates a random value $r_i$, and generates the certificate's public signature key (pseudonym) 164 as a randomized function of cocoon key $\hat{X}_i$, i.e. as a function of $\hat{X}_i$ and $r_i$. For example, either one of the following equations (Eq. 12), (Eq. 12') can be used:

$$U_i = \hat{X}_i + r_i \cdot G \quad \text{(Eq. 12)}$$

$$U_i = r_i \cdot \hat{X}_i \quad \text{(Eq. 12')}$$

Also (step 824), the PCA generates a public cocoon encryption key $\hat{E}_i$. In some embodiments, $\hat{E}_i$ is set equal to $\hat{X}_i$, i.e.

$$\hat{E}_i = \hat{X}_i \quad \text{(Eq. 13)}$$

Other expressions for $\hat{E}_i$ can also be used. For example:

$$\hat{E}_i = \text{hash}(\hat{X}_i) \cdot G + \hat{X}_i \quad \text{(Eq. 13')}$$

The remaining steps may or may not be similar to FIG. 7, but generation of the PCA signature 730 can be omitted. Specifically, in some embodiments, at step 826, the PCA forms the certificate 160p, also shown as $\text{cert}_i$, by: (1) combining $U_i$ with the metadata, e.g. the certificate's validity period 165 and the linkage value (lv) 234; and (2) digitally signing the combination to form the signature 167 (FIG. 5A).

At step 830, the PCA encrypts the package which includes (possibly consists of) the certificate 160p and the value of $r_i$. The encryption uses the corresponding cocoon key $\hat{E}_i$. An exemplary encryption scheme is ECIES; see IEEE, *IEEE Standard Specifications for Public-Key Cryptography— Amendment 1: Additional Techniques*, IEEE Computer Society, 2004, incorporated herein by reference. Other encryption schemes can also be used.

The result, i.e. the encrypted package, is sent to the RA (step 900), together with the RA request ID received by the PCA at step 818. As noted above, signature 730 is omitted. The RA cannot decrypt the package.

The RA "un-shuffles" the data received from the PCA. To perform this operation, the RA matches the RA request ID accompanying each encrypted package with the RA request ID stored in the RA's memory (step 818). The RA forwards to each device 110 the encrypted package for that device (step 910). With each encrypted package, the RA sends to the device the corresponding i value defining the associated cocoon key; see equation (Eq. 11). The RA obtains the i value from the device request associated with the RA request.

At step 914, for each certificate 160p, the associated device 110 computes the decryption key $\hat{e}_i$ corresponding to the encryption (cocoon) key $\hat{E}_i$. If $\hat{E}_i$ was set to equal $\hat{X}_i$ (equation (Eq. 13), then:

$$\hat{e}_i = x + f(i) \quad \text{(Eq. 14)}$$

In case of equation (Eq. 13'):

$$\hat{e}_i = \text{hash}(\hat{X}_i) + x + f(i) \quad \text{(Eq. 14')}$$

using the same hash function "hash" as was used in equation (Eq. 13').

The device 110 uses the decryption key $\hat{e}_i$ to decrypt the package, and thus recovers the certificate 160p and the corresponding $r_i$. This decryption key works because, in case of equations (Eq. 13), (Eq. 14), the encryption public key is:

$$\hat{E}_i = \hat{X}_i = x \cdot G + f(i) \cdot G$$

In case of equations (Eq. 13'), (Eq. 14'), the decryption works because the encryption public key is:

$$\hat{E}_i = \text{hash}(\hat{X}_i) \cdot G + \hat{X}_i = \text{hash}(\hat{X}_i) \cdot G + x \cdot G + f(i) \cdot G$$

At step 918, the device verifies the PCA signature 167 using the PCA's public signature key $U_{PCA}$.

At step 922, the device computes its private signature key $u_i$ corresponding to $U_i$. If $U_i$ was computed as in equation (Eq. 12), then the private signature key is created as:

$$u_i = r_i + x + f(i) \quad \text{(Eq. 15)}$$

If equation (Eq. 12') was used, then the private signature key is created as:

$$u_i = r_i \cdot (x + f(i)) \quad \text{(Eq. 15')}$$

See (Eq. 12). At step 924, the device verifies that $$u_i \cdot G = U_i \quad \text{(Eq. 16)}$$

If any of the above checks or verifications fails, the device may reject the certificate 160p and/or all the certificates in the batch. The device may also inform pertinent authorities (e.g. misbehaving authority 250) about the error in order to trigger maintenance and/or security operations on malfunctioning or dishonest RA or PCA.

Security Analysis:

While this process does not include the signature 730 computation, this process still prevents Man-in-the-Middle attacks by the RA. The reason is that the PCA computes the encryption key $\hat{E}_i$ from $\hat{X}_i$ (step 824, equation (Eq. 13) or (Eq. 13')) in such a manner that any manipulation by the RA is detectable by the device when validating the public key $U_i$ (steps 922, 924). More particularly, suppose for example that the PCA uses the equation (Eq. 13), and a malicious RA replaces the correct value of $\hat{X}_i$ by $$\hat{X}_i^* = z \cdot G \quad \text{(Eq. 17)}$$

for an arbitrary value of z. In this case, at step 830, the PCA will encrypt the certificate with $\hat{E}_i = \hat{X}_i^*$ (step 824, equation (Eq. 13)) allowing the RA to decrypt the PCA's response by means of the decryption key $\hat{e}_i^* = z$, thus learning the device's final public key $U_i^*$ (created at step 822). However, if the RA modifies the certificate 160p, and in particular the pseudonym $U_i^*$, because the RA cannot forge the PCA signature 167 if the certificate is modified, and the device would detect the incorrect signature 167 at step 918. Therefore, before re-encrypting the certificate, the RA would have to find a value $r_i^*$ that matches $U_i^*$. For example, in case of equation (Eq. 12), the value $r_i^*$ would have to satisfy:

$$(r_i^* + x + f(i)) \cdot G = U_i^* \quad \text{(Eq. 18)}$$

so $r_i^*$ can replace the original $r_i$ provided by the PCA in the RA-to-device response. Otherwise, the device would notice, at step 924, that the provided value of $r_i^*$ does not satisfy Eq. 16, i.e., that $$(r_i^* + x + f(i)) \cdot G \neq U_i^*$$

This verification would fail and the corresponding key would be identified as invalid by the device, frustrating the attack. Unfortunately for the malicious RA, this means that $r_i^*$ must be set to:

$$r_i^* = (r_i + z) - (x + f(i))$$

which is equivalent to solving the elliptic curve discrete logarithm problem (ECDLP) for the point $(U_i^* - \hat{X}_i)$. Actually, since $f(i)$ is known to the RA, z can be freely chosen by it, and $r_i$ is learned due to the attack, this problem can be reduced to finding x given the value of X provided by the vehicle, which is still an ECDLP instance. Hence, assuming the computational hardness of the ECDLP, the attack itself becomes computationally unfeasible for cryptographically secure elliptic curves.

Note that the RA might prefer to satisfy equation (Eq. 18) by manipulating $U_i^*$ instead of (or in addition to) trying to find a valid $r_i^*$, but that is not possible in the proposed scheme: after all, $U_i^*$ is signed by the PCA, so any violation of its integrity would be detectable by the end devices.

Performance Analysis:

Besides preserving SCMS's security properties, this unified butterfly key expansion leads to a reduced overhead when compared to the original process:

Device 110: since the request sent to the RA includes a single cocoon public key (X) and pseudorandom function (f) rather than two keys and functions as in FIG. 7 or 8, the processing and bandwidth costs involved in this process drop by half. Also, the certificate packages received at step 900 are smaller because they omit the PCA signature 730. Finally, the processing costs for validating the received certificates is likely to decrease with the removal of the verification of signature 730. The reason is that verifying $U_i$ for avoiding MitM attacks by the RA (equation (Eq. 16)) takes a single elliptic-curve (EC) multiplication, less than what would be typically involved in verification of signature 730.

RA: It only performs the butterfly key expansion for signature keys, leading to half the processing overhead. Ignoring ancillary metadata, bandwidth usage is similarly reduced when forwarding the request to the PCA (step 818), which involves a single cocoon key and pseudorandom function rather than two. Finally, the response by the PCA (step 900) is smaller due to the absence of signature 730 on the encrypted package.

PCA: Each certificate issuance involves a single signature (167) instead of two (since signature 730 is omitted), leading to lower processing costs. Inbound and outbound bandwidth are also saved, since the RA's requests are smaller (they do not include a separate $\hat{E}_i$) and so are the PCA's responses (due to omission of signature 730).

To give some concrete numbers, FIG. 10 shows a table which compares the estimated costs of the proposed procedure with the original SCMS as described in CAMP, assuming the algorithms thereby recommended: ECDSA for signature generation/verification and ECIES for asymmetric encryption/decryption. Both algorithms are configured to provide a 128-bit security level. For completeness, we consider two different settings for ECDSA when measuring the processing costs of the batch verification by vehicles: a standard implementation (marked as "RP"), in which the ECDSA verification process takes basically one fixed point EC multiplication by the generator G and one random point multiplication by the PCA's signature key $U_{PCA}$; and an optimized implementation (marked as "FP"), in which $U_{PCA}$ is also considered a fixed point (i.e., this operation is made faster via pre-computations). The performance costs are measured in cycles, using the RELIC cryptography library running on an Intel i5 4570 processor. RELIC is described in D. F. Aranha and C. P. L. Gouvêa, "RELIC is an Efficient LIbrary for Cryptography," https://github.com/relic-toolkit/relic, incorporated herein by reference. The bandwidth costs are measured in bytes, ignoring eventual metadata not strictly related to the butterfly key expansion process (e.g., pre-linkage values, time period to which the certificate should be associated, etc.).

Examples of Implicit Certificate Process

Figure 11A:
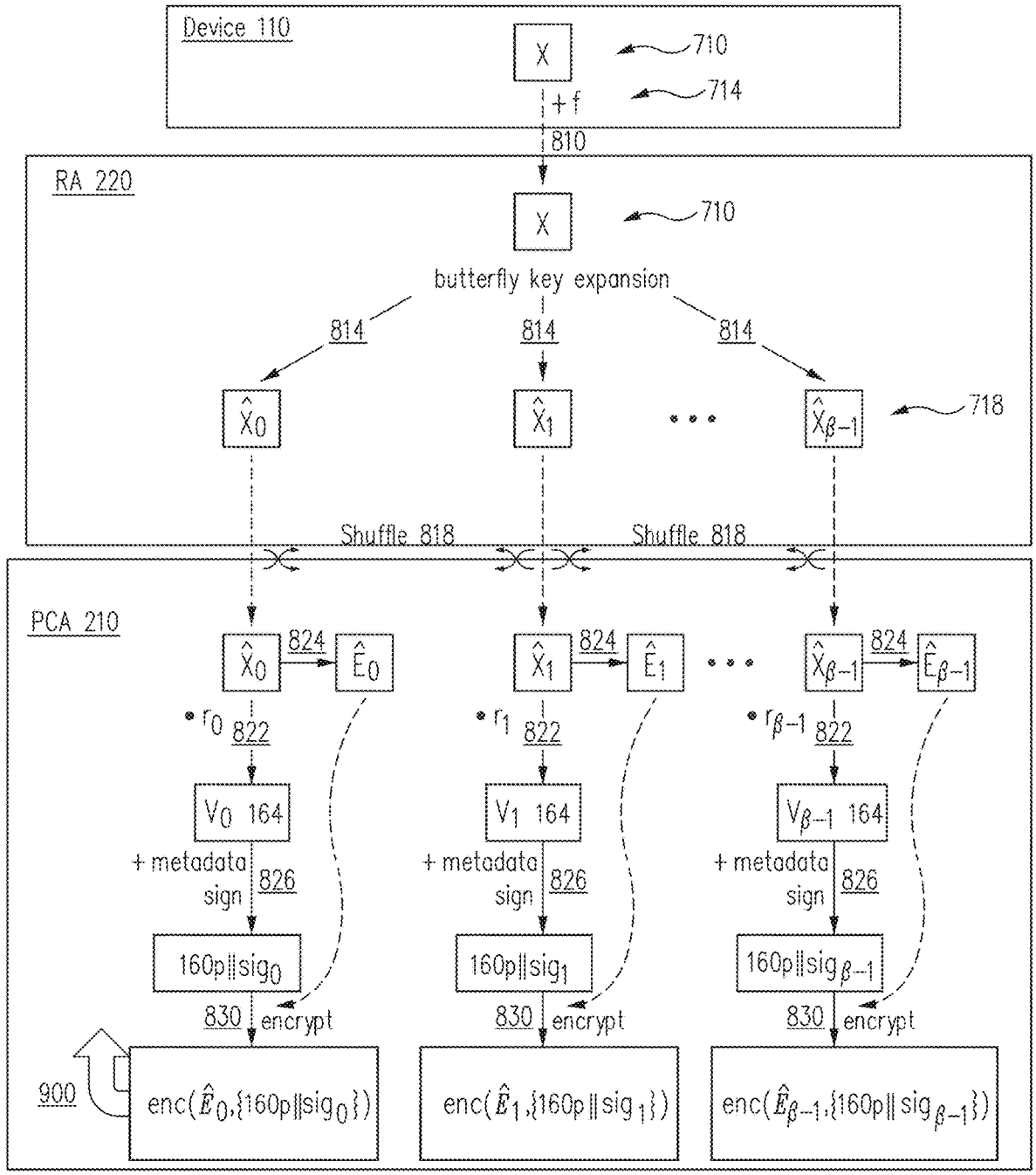
FIGS. 11A and 11B are flowcharts that illustrate processes used in some embodiments of the present invention to generate digital certificates.
Figure 11B:
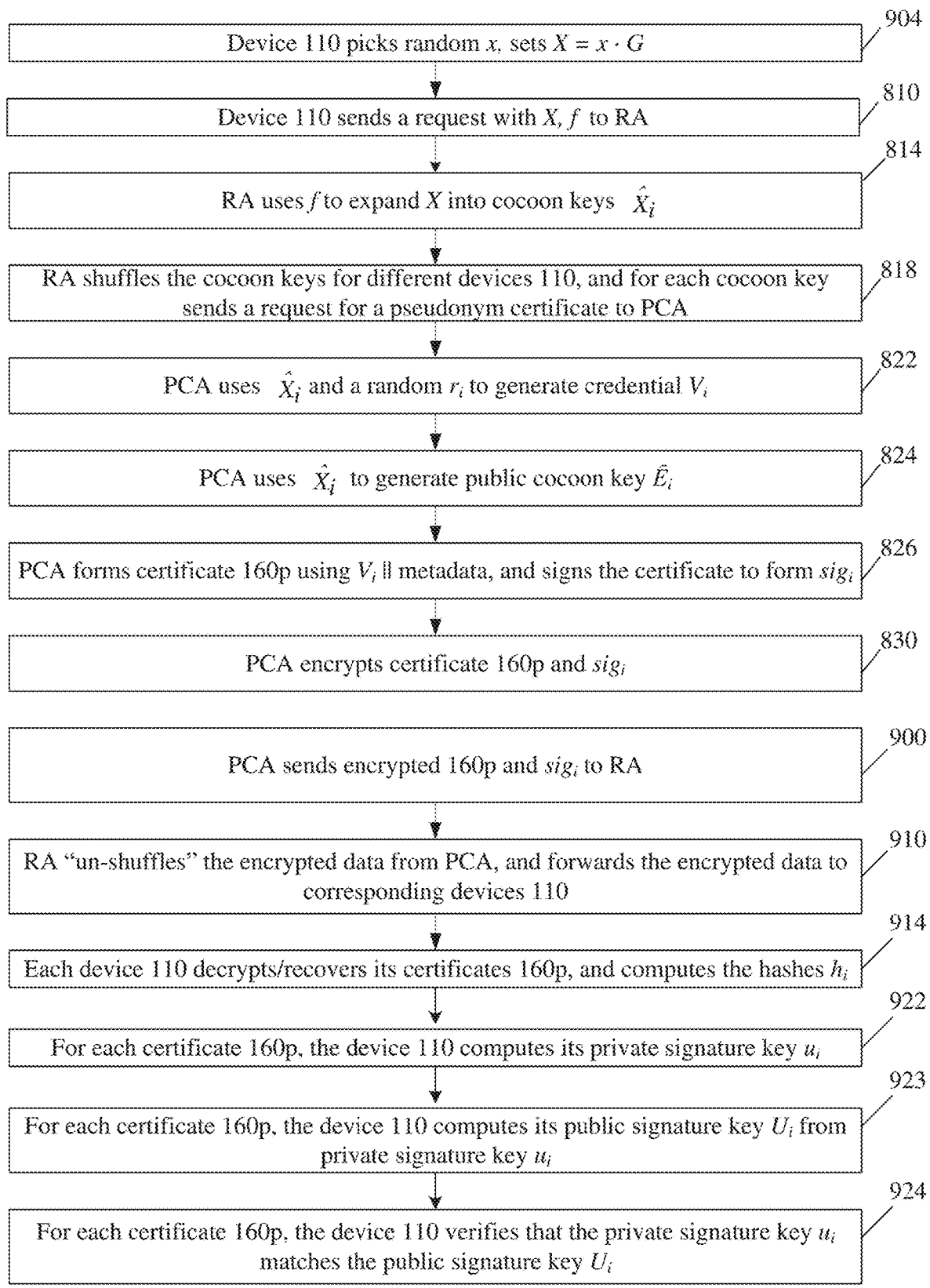

The invention is not limited to the embodiments of FIGS. 9A, 9B. For example, implicit certificates can be used. FIGS. 11A, 11B illustrate an implicit certificate scheme. Steps 904, 810, 814, 818 are as in FIGS. 9A, 9B. Then at step 822, the PCA computes a random $r_i$, and computes a credential 164:

$$V_i = \hat{X}_i + r_i \cdot G$$

At step 824, the PCA generates a public cocoon encryption key $\hat{E}_i$, possibly using the same process as for the explicit certificates, e.g. according to equation (Eq. 13) or (Eq. 13').

At step 826, the PCA creates the implicit certificate 160p, also denoted $cert_i$, as:

$$cert_i = (V_i, meta)$$

i.e.

$$cert_i = V_i \| meta$$

where "meta" is the metadata (including validity period 165 etc.).

Also at step 826, the PCA signs this certificate to obtain the signature $sig_i$ as follows:

$$sig_i = h_i \cdot r_i + u_{PCA}$$

where $h_i = Hash(cert_i)$.

At step 830, the PCA encrypts a package which includes (possibly consists of) the certificate 160p and the signature $sig_i$. The encryption uses the corresponding cocoon key $\hat{E}_i$. An exemplary encryption scheme is ECIES, but other schemes can also be used.

At steps 900 and 910, the encrypted package is sent to the requesting device 110 via the RA 220, possibly without being signed by the PCA (signature 730 is omitted), using the same process and data structures (including RA request data structures) as in FIGS. 9A, 9B. The RA cannot decrypt the package.

At step 914, the device 110 receives the encrypted package and the corresponding value i, computes the private key $\hat{e}_i$ as in equation (Eq. 14) or (Eq. 14'), uses this key to decrypt the PCA's response package $cert_i \| sig_i$, and then computes:

$$h_i = Hash(cert_i)$$

At step 922, the device sets its own private signature key to:

$$u_i = h_i \cdot (x + f(i)) + sig_i$$

and computes the corresponding public signature key at step 923 as:

$$U_i = u_i \cdot G$$

The device 110 can then verify the validity of the public key $U_i$ by ascertaining, at step 924, that $$U_i = h_i \cdot V_i + U_{PCA}$$

where $U_{PCA}$ is the PCA's public signature key.

FIG. 12 shows a table with SCMS algorithms and some of the embodiments described above. SCMS explicit certificate generation is shown at 1210. SCMS implicit certificate generation is shown at 1214. Explicit certificate generation according to some embodiments of the present invention is shown at 1230. Implicit certificate generation according to some embodiments of the present invention is shown at 1234. The following notation is used:

"pkg" denotes the output of the encryption step 830 performed by the PCA. "res" denotes the same output but signed by the PCA to form signature 730; i.e. "res" is the output of step 834 in SCMS;

In the last column, "Ver" denotes signature verification performed by device 110;

$U_p$ and $u_p$ are respectively the PCA's public and private keys.

Other features of some embodiments of the invention are described in Marcos A. Simplicio Jr. et. al., "The Unified Butterfly Effect: Efficient Security Credential Management System for Vehicular Communications", 2018, Cryptology ePrint Archive: Report 2018/089, https://eprint.iacr.org/2018/089.pdf, incorporated herein by reference.

Security and Performance

The overall security of the proposed scheme builds upon the same principles as the original SCMS butterfly key expansion. Namely, generation and usage of the caterpillar and cocoon signature keys are by PCA and RA is the same as in SCMS. Therefore, the security arguments for SCMS, which rely basically on the fact that the device's private caterpillar key x (s or e) is protected by the elliptic curve discrete logarithm problem (ECDLP, given in Definition 1 below) during the whole execution of the protocol, remain valid. Hence, neither the RA nor the PCA is able to recover the signature or decryption private keys, derived from the caterpillar key, even if the RA and PCA collude. Unlinkability among certificates is similarly preserved, as long as the RA and PCA do not collude: the shuffling done by the RA (step 818) still hides from the PCA any relationship between certificate requests (RA requests) intended for the same vehicle 110; meanwhile, the PCA's encrypted response prevents anyone but the owner 110 of the decryption key from learning $cert_i$.

Definition 1

Elliptic Curve Discrete Logarithm Problem (ECDLP). Let E be an elliptic curve over a finite field K. Suppose there are points P, Q in E(K) given such that Q is in <P> (i.e. the smallest subgroup containing P). Determine k such that Q=k·P. (See Kristin E. Lauter and Katherine E. Stange, "The elliptic curve discrete logarithm problem and equivalent hard problems for elliptic divisibility sequences", International Workshop on Selected Areas in Cryptography, pages 309-327, Springer, 2008, incorporated herein by reference.)

The unified key approach introduces two changes to SCMS: (1) it modifies the manner by which the cocoon encryption key is computed, and (2) it eliminates the PCA's signature 730 on the encrypted package. The first modification could affect the confidentiality of the communication, thus allowing the RA to learn $cert_i$. Meanwhile, since the final signature made by the PCA on its response is aimed at ensuring the system's security against MitM attacks by the RA, the second modification could result in vulnerabilities on that aspect. However, in what follows we show that the unified key approach still protects the pseudonym certificates' contents and prevents MitM attacks, assuming the hardness of the ECDLP. More precisely, we show that the problem of decrypting the PCA's response encrypted with $\hat{X}_i$ can be reduced to an instance of ECDLP.

The same computational hardness applies to MitM attacks, for which we show that the PCA's response is handled in such a manner that any manipulation by the RA is detectable by the device when validating the public key $U_i$, either explicitly or implicitly.

Confidentiality of Pseudonym Certificates

In SCMS, the goal of encrypting the response package with a public encryption key $\hat{E}$ is to prevent the RA from learning its contents. This is accomplished simply by using $\hat{E}$ for which the corresponding private key $\hat{e}$ remains unknown to the RA. The unified approach proposed then builds upon the observation that both the encryption e and signature s private keys need to remain protected in SCMS, which can still be done if they are combined into a single piece of information. Indeed, the security of using $\hat{X}_i$ (i.e. $\hat{S}_i$ or $\hat{E}_i$) directly as encryption key can be seen from the following Theorem 1.

Theorem 1

Security of the unified butterfly key expansion against eavesdropping by RA: Suppose that the RA follows a honest-but-curious security model, sending the correct $\hat{X}_i = X + f(i) \cdot G$ to the PCA. In that case, the RA is unable to recover the contents of the PCA's encrypted response pkg in polynomial time unless it is able to solve an instance of the elliptic curve discrete logarithm problem (ECDLP) in polynomial time.

Proof.

The proof is straightforward: if the encryption is performed with a secure algorithm, there should be no polynomial-time algorithm that allows decryption without knowledge of $\hat{x}$, nor a polynomial-time algorithm that allows the recovery of this key from pkg. Hence, violating the confidentiality of the scheme requires the recovery of $\hat{x}$ from either X or $\hat{X}_i$. After all, besides pkg itself, these are the only pieces of information possessed by the RA that carry some relationship with the decryption key $\hat{x}$. However, since $\hat{X}_i = X + f(i) \cdot G$, where $f(i)$ is known by the RA, this task is equivalent to finding x from X, i.e., to solving the ECDLP for X.

Security Against MitM Attacks by RAs in the Implicit Model

The security result obtained immediately above assumes that the RA follows the unified key expansion protocol, providing the correct $\hat{X}_i$ to the PCA. However, the RA might prefer to replace this key with $\hat{X}_i^* = z \cdot G$, for an arbitrary value of z. In this case, the confidentiality of the process would be lost, because the PCA would encrypt pkg with $\hat{X}_i^*$ and the result would be decrypted by the RA using the corresponding private key z. Therefore, we need to also consider the security of this Man-in-the-Middle scenario, which is complementary to the "honest-but-curious" scenario previously assumed. We impose no constraint on the (mis)behavior of the RA, letting it freely choose $\hat{X}_i^*$ as long as the choice: (1) leads to some advantage to the RA, in particular the ability to violate the confidentiality or integrity of pkg; and (2) the misbehavior is not detected by vehicles 110, so the vehicles believe it is safe to use the corresponding certificates. With this scenario in mind, we can formulate Theorem 2.

Theorem 2

Security of the unified butterfly key expansion against MitM attacks in the implicit model: Suppose that the RA replaces $\hat{X}_i$ by an arbitrary $\hat{X}_i^*$ in the request for implicit certificates sent to the PCA. Assuming the hardness of the ECDLP in the random oracle model, the RA cannot violate the integrity or confidentiality of the PCA's response pkg without the requesting vehicle's knowledge.

Proof.

We start by noticing that the integrity of pkg's contents is protected despite the lack of the PCA signature over it. Indeed, even if the RA is somehow able to violate the confidentiality of pkg, it would only be able to obtain the (signed) implicit certificate $cert_i$. However, $cert_i$ is not treated as confidential in the implicit certification model (Certicom, Section 3.4), and yet such model ensures the integrity of $cert_i$ in the random oracle model assuming the hardness of the ECDLP. Therefore, the implicit certification itself already ensures that any modification of $cert_i$, either directly (i.e., after decrypting pkg) or indirectly (i.e., by modifying only the ciphertext), would be detectable by vehicles.

Proving the confidentiality of the unified key expansion, however, requires some more effort because we cannot rely so directly on the security properties of implicit certificates. Once again, we follow the reductionist approach, showing that violating the confidentiality of pkg requires the resolution of an instance of the ECDLP.

Suppose that the malicious RA replaces the correct value of $\hat{X}_i$ by $\hat{X}_i^* = z \cdot G$, for an arbitrary value of z. This assumption comes without loss of generality, since in principle we do not impose any restriction on the actual value of z chosen by the RA. Upon reception of the RA's request, the PCA ends up encrypting the implicit certificate $cert_i$ with $\hat{X}_i^*$, since it is unable to detect such misbehavior. As a result, the RA can decrypt the PCA's response using z as the decryption key, thus violating the confidentiality of the system. This attack would allow the RA to learn the vehicle's implicit certificate $cert_i^* = (V_i^*, meta)$, where $V_i^* = \hat{X}_i^* + r_i \cdot G$, as well as its corresponding signature $sig_i^* = h_i^* \cdot r_i + u_{PCA}$, where $h_i^* = Hash(cert_i^*)$.

However, this misbehavior by the RA can be detected by the vehicle because, for any $z \neq x + f(i)$, the resulting $sig_i^*$ would not be a valid signature for the actual $\hat{X}_i$ expected by the vehicle. More precisely, after the vehicle computes $U_i = u_i \cdot G$ for $u_i = h_i^* \cdot (x + f(i)) + sig_i^*$, the implicit verification $U_i \stackrel{?}{=} h_i^* \cdot V_i^* + U_{PCA}$ fails, unless $z = x + f(i)$:

$$U_i \stackrel{?}{=} h_i^* \cdot V_i^* + U_{PCA}$$

$$u_i \cdot G \stackrel{?}{=} h_i^* \cdot (\hat{X}_i^* + r_i \cdot G) + U_{PCA} \cdot G$$

$$(h_i^* \cdot (x+f(i)) + sig_i^*) \cdot G \stackrel{?}{=} (h_i^* \cdot (z + r_i) + u_{PCA}) \cdot G$$

$$h_i^* \cdot (x+f(i)) + h_i^* \cdot r_i + u_{PCA} \stackrel{?}{=} h_i^* \cdot (z+r_i) + u_{PCA}$$

$$h_i^* \cdot (x+f(i)) \stackrel{?}{=} h_i^* \cdot z$$

$$x + f(i) \stackrel{?}{=} z, \text{ Assuming } h_i^* \neq 0$$

Therefore, to be able to bypass the vehicle's verification, the RA cannot just choose any z. Instead, it is obliged to make $z = x + f(i)$. Even though $f(i)$ is known by the RA, finding the value of x that allows the computation of z with this characteristic is equivalent to solving the ECDLP for X.

Security Against MitM Attacks by RAs in the Explicit Model

The security arguments for explicit certificates are similar to those presented in the immediately preceding section for the implicit model, as summarized in Theorem 3.

Theorem 3

Security of the unified butterfly key expansion against MitM attacks in the implicit model: Suppose that the RA replaces $\hat{X}_i$ by an arbitrary $\hat{X}_i^*$ in the request for explicit certificates sent to the PCA. Assuming the hardness of the ECDLP, the RA cannot violate the integrity or confidentiality of the PCA's response pkg without the requesting vehicle's knowledge.

Proof.

Once again, it is easy to show that the explicit certificate $cert_i$ enclosed in the PCA's encrypted response, pkg, cannot be modified while avoiding detection by vehicles. After all, the certi is itself digitally signed by the PCA, so any modification would invalidate the signature assuming that a secure algorithm was employed for its computation. Therefore, even if the confidentiality of pkg is somehow violated by the RA, that might allow the (unsigned) value of $r_i$ to be modified, but not the modification of the (signed) certi. Indirectly, however, the non-malleability of $cert_i$ also ensures that a possible modification of $r_i$ would be detectable by the vehicle. The reason is that the value of $U_i$ obtained from $cert_i$ is verified by the vehicle when it computes $u_i = r_i + x + f(i)$ and then checks if $u_i \cdot G \stackrel{?}{=} U_i$. Since x and $f(i)$ are known by the vehicle (i.e., cannot be manipulated by the RA), and $U_i$ is fixed in the certificate, turning $r_i$ into $r_i^* \neq r_i$ would lead to $u_i^* = r_i^* + x + f(i) \neq u_i$ and hence to $u_i^* \cdot G \neq U_i$. Therefore, none of the pkg's contents can be modified without detection by the vehicle.

The final verification performed by the vehicle also ensures the confidentiality of the unified key expansion, assuming the hardness of the ECDLP to which this problem can be reduced. To prove this, we once again suppose without loss of generality that the malicious RA replaces $\hat{X}_i$ by $\hat{X}_i^* = z \cdot G$, for an arbitrarily chosen value of z. In this case, the RA uses z to decrypt the PCA's response and then learns: (1) the device's final public key $U_i^* = r_i \cdot G + \hat{X}_i^*$ enclosed in the certificate; and (2) the value of $r_i$ itself.

To avoid detection, the RA would then have to re-encrypt the PCA's response in such a manner that the vehicle does not notice that $\hat{X}_i$ was not used in the computation of the received $U_i^*$. Accomplishing this requires replacing the original $r_i$ by some $r_i^*$ that passes the verification process performed at the vehicle, i.e., that satisfies $(r_i^* + x + f(i)) \cdot G = U_i^*$. Otherwise, the vehicle that performs this final verification would identify the received $U_i^*$ as invalid, frustrating the attack. Unfortunately for the RA, however, this means that $r_i^*$ must be set to $(r_i + z) - (x + f(i))$, meaning that finding such $r_i^*$ is equivalent to solving the ECDLP for the point $(U_i^* - \hat{X}_i)$. Equivalently, since $f(i)$ is known by the RA, z can be freely chosen by it, and $r_i$ is learned due to the attack, this problem can be reduced to finding x given the value of X provided by the vehicle. Nevertheless, this is still an ECDLP instance, which concludes the proof.

Additional Security Aspects

As an additional remark, the original SCMS design proposes the adoption of two caterpillar keys most likely because it is considered a good practice to avoid using the same (or even correlated) public/private key pair for encryption and signature. The main reason for this recommendation is that possible vulnerabilities (e.g., implementation errors) found in one process may leak the key for the other. See Jean-Sébastien Coron, Marc Joye, David Naccache, and Pascal Paillier, "Universal padding schemes for RSA", In Proceedings of the 22Nd Annual International Cryptology Conference on Advances in Cryptology, CRYPTO '02, pages 226-241, London, U K, 2002, Springer-Verlag, incorporated herein by reference. Hence, if an attacker can somehow interact with a vehicle in such a manner that (1) the vehicle works as an oracle for one process, and then (2)

recover the private key thereby employed, then (3) that would also give away the private key for the other process.

At first sight, it may seem that the strategy hereby described violates this general rule by creating a key $\hat{X}_i$ that is used both for encryption (by the PCA) and for generating digital signature (by the vehicles). However, this is not the case in the proposed scheme. The reason is that the private key $\hat{x}_i$ corresponding to $\hat{X}_i$ is actually never used for signing any piece of data. Instead, vehicles use $u_i = \hat{x}_i + r_i$ as signature keys in the explicit model, and $h_i \cdot \hat{x}_i + sig_i$ in the implicit model, where $r_i$ and $sig_i$ are secret values known only by the vehicle and the PCA. As long as $r_i \neq 0$ (for explicit certificates) and $sig_i \neq 0$ (for implicit ones), any predictable correlation between the encryption and the signature processes is eliminated from the perspective of all entities (as expected from randomly-generated keys), except for the PCA itself. Interestingly, this approach follows the same line of thought behind the butterfly key expansion process that is the basis for SCMS: different signature cocoon keys are generated from the same secret information (the caterpillar key), but this correlation is known only by the vehicle and a system entity (in this case, the RA). Therefore, the proposed modification can be seen as a natural development of the original SCMS protocol.

Finally, as an exercise, it is useful to consider which kind of implementation flaw would be necessary to jeopardize the resulting system's security. We start by noticing that, even if the signature key $u_i$ is somehow compromised, recovering $\hat{x}_i$ as a result of this flaw would only be feasible by the PCA, since it would still be the only entity with knowledge of the $r_i$ or $sig_i$ associated to the compromised $U_i$. However, the PCA would gain nothing by doing so, because it already knows the plaintext protected with the $(\hat{X}_i, \hat{x}_i)$ key pair: after all, the PCA is the one who encrypted that plaintext in the first place. Hence, the only implementation issue that might lead to a useful attack against the UBK process refers to the compromise of the encryption key $\hat{x}_i$. Such attack would require capturing the PCA's response carrying $r_i$ and $sig_i$, so the signature key $u_i$ can be recovered and messages can be forged with it. Once again, however, this is only feasible by an RA or PCA, but not by external entities. The reason is that in SCMS the PCA-RA and RA-vehicle communications are always protected using secure (e.g., TLS-based) channels, so RA and PCA are the only entities (besides the vehicle itself) with access to the PCA's response. The RA and the PCA, on the other hand, would not gain much (if anything) by engaging in such attacks, since they could by themselves (even without colluding) create valid certificates and sign the corresponding messages.

Performance Analysis

Besides preserving SCMS's security properties, this unified butterfly key expansion leads to a reduced overhead when compared to the original process:

Vehicle: since the request sent to the RA includes a single cocoon public key and a single PRF rather than two, the processing and bandwidth costs involved in this process drop by half. The batches received are also smaller, because each encrypted package containing a certificate is not signed (only the certificate itself is). Finally, the processing costs for validating the received certificates is smaller than in SCMS, since the verification of the PCA's signature on the encrypted package is eliminated. This is particularly interesting for digital signature schemes such as ECDSA, for which verification procedure is usually more expensive than signing messages. See Daniel J. Bernstein, Niels Duif, Tanja Lange, Peter Schwabe, and Bo-Yin Yang, "High-speed high-security signatures", In Cryptographic Hardware and Embedded Systems—CHES 2011, pages 124-142, Berlin, Heidelberg, 2011, Springer Berlin Heidelberg, incorporated herein by reference.

RA: It only performs the butterfly key expansion for signature keys, leading to half the processing overhead. Ignoring ancillary metadata, bandwidth usage is similarly reduced when forwarding the request to the PCA, which involves a single cocoon key and a single PRF rather than two of each. Finally, the response by the PCA is also smaller due to the absence of a signature on the encrypted package.

PCA: The processing savings come from the fact that each (implicit or explicit) certificate issued takes a single signature instead of two. Inbound and outbound bandwidth are also saved, since the RA's requests are smaller (they do not include $\hat{E}_i$) and so are the PCA's responses (one less signature is sent).

To give some concrete numbers, the table in FIG. 13 compares the estimated costs of the proposed procedure with the original SCMS as described in CAMP, assuming the algorithms thereby recommended: ECDSA for signature generation/verification and ECIES for asymmetric encryption/decryption. Both algorithms are configured to provide a 128-bit security level. Specifically, FIG. 13 illustrates comparison of processing (in cycles, shown in a gray background) and communication (in bytes) costs between the original SCMS and the proposed solution when issuing $\beta$ certificates, including request and response.

The bandwidth costs are measured in bytes, ignoring eventual metadata not strictly related to the butterfly key expansion process (e.g., pre-linkage values, time period to which the certificate should be associated, etc.). The processing costs are measured in cycles, using the RELIC cryptography library version 0.4.1 (see Aranha et al.) running on an Intel i5 4570 processor. For completeness, we consider two different settings for ECDSA when measuring the processing costs of the batch verification by vehicles: a standard implementation, in which the verification process takes basically one fixed-point EC multiplication by the generator G and one random-point multiplication by the PCA's signature key U; and an optimized implementation, in which U is also considered a fixed point. More precisely, RELIC relies on pre-computation for fixed-point EC multiplications, using the fixed comb method with w=8. For the random-point multiplication, RELIC is set to use the Montgomery ladder method, thus providing an isochronous operation. As a result, fixed-point multiplications end up being approximately 8 times faster than their random-point counterparts. In practice, the adoption of this optimized version is interesting because multiplications by U are expected to be performed multiple times per batch, so the underlying pre-computation costs can be amortized. Nevertheless, real-world deployments may involve multiple values of U per batch, e.g., because the RA's policy dictates that different PCAs are contacted so the revocation of one PCA does not invalidate the entire batch, or for improved privacy. In this latter case, the standard implementation may be preferred over the one that turns U into a fixed point.

As shown in FIG. 13, the bandwidth and processing gains of the proposed unified butterfly key expansion process can reach up to 50%, whereas in the worst case it is at least as efficient as SCMS's original approach. It is interesting to note that those gains are slightly more significant in the implicit certification model, which is the approach suggested for standardization CAMP.

CONCLUDING REMARKS

Data authentication and user privacy are essential for preventing abuse in intelligent transportation systems, either by drivers or by the system itself. This is, however, a challenging task, in particular because any acceptable solution needs to cope with constraints on the vehicle's side such as limited connectivity and processing power. Fortunately, SCMS's pseudonym certificates provisioning and revocation processes are able to address such requirements while also taking into account performance and scalability issues.

This process can be optimized. Namely, some embodiments of the present invention provide a novel, unified butterfly key expansion in which two vehicle-provided keys are replaced by a single one. Besides eliminating the need of including such extra key in the vehicle's requests, this approach also removes one signature from each pseudonym certificate generated in response (and, hence, the corresponding costs for their creation, transmission and verification). As a result, when compared to SCMS's pseudonym certificate provisioning protocol, we are able to obtain processing and bandwidth savings (both downstream and upstream) that reach as high as 50%. This is especially relevant when considering that the number of certificates provisioned per vehicle is expected to range from a few thousands (see Whyte et al.) to tens of thousands (see Virendra Kumar, Jonathan Petit, and William Whyte, "Binary hash tree based certificate access management for connected vehicles", In Proc. of the 10th ACM Conference on Security and Privacy in Wireless and Mobile Networks, WiSec '17, pages 145-155, New York, N.Y., USA, 2017, ACM, incorporated herein by reference). In addition, these gains are more noticeable at the vehicles' side, which are exactly the most resource-constrained entities in the system. Finally, the proposed schemes works for either implicit or explicit certificates, while still preserving the system's security, flexibility and scalability in both cases.

An advantage of some embodiments is their efficient approach for issuing multiple pseudonym certificates from a small piece of information, avoiding inefficiencies identified in the state-of the-art. In particular, bandwidth and computational savings are provided when compared to the original "butterfly key expansion" process adopted in SCMS.

In some embodiments, the pseudo-random functions $f, f_s, f_e$ can be as in SCMS. In particular (see Whyte et al. and CAMP), given a pair or integers ($\iota=(i,j)$), such a function $f=f_k(\iota)$ can be defined as in NIST curve NISTp256 (National Institute of Standards and Technology. (1999, July) Recommended elliptic curves for federal government use. Available: http://csrc.nist.gov/groups/ST/toolkit/documents/dss/NISTReCur.doc), incorporated herein by reference), and more particularly:

$f_k(\iota)=f^{int}_k(\iota) \mod l$, where:

1) $f^{int}_k(\iota)$ is the big-endian integer representation of
$(AES_k(x+1) \oplus (x+1))k \|$
$(AES_k(x+2) \oplus (x+2))k \|$
$(AES_k(x+3) \oplus (x+3))$,
2) x+1, x+2, and x+3 are obtained by simply incrementing x by 1 each time, e.g., if x=01 . . . 00, then x+1=01 . . . 01, x+2=01 . . . 10, x+3=01 . . . 11,
3) 128-bit input x (the seed) for AES is derived from time period $\iota=(i, j)$ as: $x=0^{32}\|i\|j\|0^{32}$.

The expansion function for encryption keys is also defined as above except x is derived as: $x=1^{32}\|i\|j\|0^{32}$.

In the above definition, AES is used in the Davies-Meyer mode, as $f_k$ does not need to be invertible. The Davies-Meyer mode is described in "_____. TS 102 867 v 1.1.1, Intelligent Transportation Systems (ITS); Security; Stage 3 mapping for IEEE 1609.2", incorporated herein by reference.

Also, AES is applied 3 times to ensure that the outputs of $f_k$ are uniformly distributed with negligible biases, if any.

In the butterfly key expansion process, one of the two integers (i,j) can be held to a predefined constant value while the other integer varies from 0 to β.

Other pseudo-random functions can also be used. A pseudo-random function (PRF) is such that no efficient algorithm can distinguish (with significant advantage) between a function chosen randomly from the PRF family and a random oracle (a function whose outputs are fixed completely at random). Non-pseudo-random functions can also be used.

The invention is not limited to any particular algebraic group. Any group considered secure would be appropriate. Some embodiments use the same elliptic curve groups as SCMS. NIST-approved elliptic curves are appropriate. They are described at: https://nvlpubs.nist.gov/nistpuns/FIPS/NIST.FIPS.186-4.pdf.

The methods according to the invention are not limited to a particular order of steps. For example, in FIGS. 9A and 9B, step 824 can be performed before 822, or the two steps can be performed simultaneously. Other variations are also possible.

In addition to the methods, the invention includes computing and communication entities configured to perform any part or whole of any method of the invention, and parts of such entities. For example, an entity can be as in FIG. 2, including one or more computer processors executing computer instructions stored in storage 150S. The invention includes storage 150S, or other computer readable medium, with suitable data such as request IDs, etc. described above, or parts thereof, and/or with computer instructions for computer processor(s) to perform any part or whole of any method described above. The invention includes the data structures and the instructions, and transmission (via a network or otherwise) or any such data and/or instructions.

The invention is not limited to a specific type of computer systems implementing the PCA, the RA, and other pieces. The devices 110 are not limited to vehicle-installed devices.

The invention includes operations by entities operable to perform computing on digital values and to communicate with each other. An entity can be an RA or PCA or MA for example. Each entity can be implemented by separate equipment, e.g., a computer, such as shown in FIG. 2, with a separate processor 150P and a separate storage 150S for each entity. Storage 150S may hold the data and computer instructions executed by the processor 150P. Different entities can be located in different geographical areas. However, different entities may be implemented on the same computer, for example, a cloud computer. Each entity does not have access to any other entity's data.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications. Thus, the scope of the present application should be limited only by the following claims, and it is appropriate that the claims be construed broadly and in a manner consistent with the scope of the embodiments disclosed herein.

What is claimed is:

1. A method for obtaining digital certificates by a device which is one of a plurality of entities operable to perform computing on digital values and to communicate with each other, the method comprising:

generating, by the device, a private/public key pair comprising the device's private key and the device's corresponding public key;

sending, by the device, the device's public key to an entity which is one of said entities wherein the device's public key can be expanded to generate a plurality of cocoon keys for the device, wherein each cocoon key can be used to generate a respective encryption key or signature key;

in response to sending the device's public key, receiving one or more responses by the device, each response comprising an encrypted package, each encrypted package comprising a package encrypted using a respective encryption key and comprising an associated digital certificate;

for each encrypted package:

generating, by the device, an associated decryption key as a function of the device's private key;

decrypting, by the device using the associated decryption key, the encrypted package to recover the digital certificate, the digital certificate comprising the digital certificate's public key data; and generating, by the device, the digital certificate's private key corresponding to the digital certificate's public key data, the digital certificate's private key being generated as a function of the device's private key.

2. The method of claim 1, further comprising verifying by the device that the digital certificate is valid, wherein said verifying comprises verifying that the digital certificate's public key data matches an associated public encryption key.

3. The method of claim 2 wherein said verifying that the digital certificate is valid is performed using a public key of a certificate authority, and each encrypted package is unsigned by the certificate authority.

4. The method of claim 2, wherein:
the digital certificate's private key is generated from data related to the associated decryption key; and
said verifying that the digital certificate's public key data matches the associated public encryption key comprises verifying that the digital certificate's public key data matches the digital certificate's private key.

5. The method of claim 2, wherein the digital certificate is implicit, and said verifying that the digital certificate's public key data matches the associated public encryption key comprises:
(a) generating the digital certificate's public key using the digital certificate's public key data without using the digital certificate's private key;
(b) generating the digital certificate's public key using the digital certificate's private key; and
(c) matching the digital certificate's public keys provided by operations (a) and (b).

6. The method of claim 1, wherein the one or more responses are a plurality of the responses, each response including, in addition to the encrypted package, an index identifying the response, wherein the device generates a separate associated decryption key for each response.

7. A method for obtaining digital certificates by a device which is one of a plurality of entities operable to perform computing on digital values and to communicate with each other, the method comprising:

sending, by the device, the device's public key to an entity which is one of said entities, the device's public key corresponding to the device's private key, the device's private and public keys forming the device's private/public key pair, wherein the device's public key can be expanded to generate a plurality of cocoon keys for the device, wherein each cocoon key can be used to generate a respective encryption key or signature key;

in response to sending the device's public key, receiving one or more responses by the device, each response comprising an encrypted package, each encrypted package comprising a package encrypted using a respective encryption key and comprising an associated digital certificate;

for each encrypted package:

generating, by the device, an associated decryption key as a function of the device's private key;

decrypting, by the device using the associated decryption key, the encrypted package to recover the digital certificate; and verifying by the device that the digital certificate is valid, wherein said verifying comprises verifying that the digital certificate matches the associated decryption key.

8. The method of claim 7, wherein said verifying that the digital certificate is valid is performed using a public key of a certificate authority.

9. The method of claim 7 wherein said verifying that the digital certificate matches the associated decryption key comprises:
(a) generating the digital certificate's public key using the associated decryption key;
(b) obtaining the digital certificate's public key from the digital certificate without using any private data; and
(c) matching the digital certificate's public keys provided by operations (a) and (b).

10. The method of claim 9 wherein the digital certificate is implicit.

11. The method of claim 7, wherein the one or more responses are a plurality of the responses, wherein the device generates a separate associated decryption key for each response.

12. The method of claim 7, wherein the device comprises a vehicle, and the sending and receiving operations are wireless transmissions.

13. The method of claim 7, further comprising the device using the digital certificates to authenticate itself in communicating with other entities.

14. The method of claim 7, wherein the digital certificates are pseudonym certificates.

15. A device that is one of a plurality of entities operable to perform computing on digital values and to communicate with each other, the device being configured to obtain digital certificates in communication with one or more other entities, the device comprising:

a memory containing machine readable medium storing machine executable code;

one or more processors coupled to the memory and configured to execute the machine executable code to cause the one or more processors to:

generate a private/public key pair comprising the device's private key and the device's corresponding public key;

send the device's public key to an entity which is one of said entities, the device's public key corresponding to the device's private key, the device's private and public keys forming the device's private/public key pair, wherein the device's public key can be expanded to generate a plurality of cocoon keys for the device, wherein each cocoon key can be used to generate a respective encryption key or signature key;

in response to sending the device's public key, receive one or more responses, each response comprising an encrypted package, each encrypted package comprising a package encrypted using a respective encryption key and comprising an associated digital certificate;

for each encrypted package:
- generate an associated decryption key as a function of the device's private key;
- decrypt, using the associated decryption key, the encrypted package to recover the digital certificate; and
- verify that the digital certificate is valid, wherein said verifying comprises verifying that the digital certificate matches the associated decryption key.

16. The device of claim 15, wherein said verifying that the digital certificate is valid is performed using a public key of a certificate authority.

17. The device of claim 15 wherein said verifying that the digital certificate matches the associated decryption key comprises:
(a) generating the digital certificate's public key using data defining the associated decryption key;
(b) obtaining the digital certificate's public key from the digital certificate without using any private data; and
(c) matching the digital certificate's public keys provided by operations (a) and (b).

18. The device of claim 17 wherein the digital certificate is implicit.

19. The device of claim 16, wherein each encrypted package received by the device is unsigned by the certificate authority.

20. The device of claim 15, wherein the one or more responses are a plurality of the responses, wherein the one or more processors are configured to generate a separate associated decryption key for each response.

21. The device of claim 15, wherein the device comprises a vehicle, and the sending and receiving operations are wireless transmissions.

22. The device of claim 15, wherein the device is one or more processors are further configured to use the digital certificates to authenticate itself in communicating with other entities.

23. The device of claim 15, wherein the digital certificates are pseudonym certificates.

24. The device of claim 15, wherein each digital certificate is implicit.

* * * * *